(12) United States Patent
Ohsiek et al.

(10) Patent No.: US 11,720,746 B1
(45) Date of Patent: Aug. 8, 2023

(54) TECHNIQUES FOR DATA OBJECT GENERATION

(71) Applicant: Salesforce, Inc., San Francisco, CA (US)

(72) Inventors: Elizabeth Merrill Ohsiek, Denver, CO (US); Scott Allan Huhn, San Francisco, CA (US)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 17/933,290

(22) Filed: Sep. 19, 2022

(51) Int. Cl.
| | |
|---|---|
| *G16H 15/00* | (2018.01) |
| *G06F 40/186* | (2020.01) |
| *G06F 40/103* | (2020.01) |
| *H04L 67/63* | (2022.01) |

(52) U.S. Cl.
CPC .......... *G06F 40/186* (2020.01); *G06F 40/103* (2020.01); *H04L 67/63* (2022.05)

(58) Field of Classification Search
CPC ....... G06F 40/186; G06F 40/103; H04L 67/63
See application file for complete search history.

(56) References Cited

U.S. PATENT DOCUMENTS

2020/0294639 A1* 9/2020 Freeburg, II .......... G06F 40/186

FOREIGN PATENT DOCUMENTS

CN 113065048 A * 7/2021 .......... G06F 11/3006

* cited by examiner

*Primary Examiner* — Hassan Mrabi
(74) *Attorney, Agent, or Firm* — Holland & Hart LLP

(57) ABSTRACT

Methods, systems, and devices for data object generation are described. A data service may receive an application programming interface (API) request that indicates a first template, a second template, a data set, and one or more user identifiers. The data service may retrieve the first template and the second template from a template library in response to the API request. The data service may generate a data object based on importing fields from the data set to the second template and linking the second template to the first template in accordance with a mapping between variables in the first template and the fields from the data set. The data service may transmit an API response that includes an identifier of the data object that is accessible to the one or more user identifiers.

20 Claims, 13 Drawing Sheets

TECHNIQUES FOR DATA OBJECT GENERATION

FIELD OF TECHNOLOGY

The present disclosure relates generally to database systems and data processing, and more specifically to techniques for data object generation.

BACKGROUND

A cloud platform (e.g., a computing platform for cloud computing) may be employed by many users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems).

In one example, the cloud platform may support customer relationship management (CRM) solutions. This may include support for sales, service, marketing, community, analytics, applications, and the Internet of Things (IoT). A user may utilize the cloud platform to help manage contacts of the user. For example, managing contacts of the user may include analyzing data, storing and preparing communications, and tracking opportunities and sales.

In some organizations, users may track various sales metrics, growth trends, customer interaction rates, and other information to assess the performance of an organization. This data can be shared with other users in the form of graphs, charts, documents, slides, etc. In some cases, however, users may be required to manually import, process, and format the data before sharing the data with other users. Thus, conventional mechanisms for performance-based data analysis may be manually intensive, repetitive, and error-prone.

DETAILED DESCRIPTION

Figure 1:
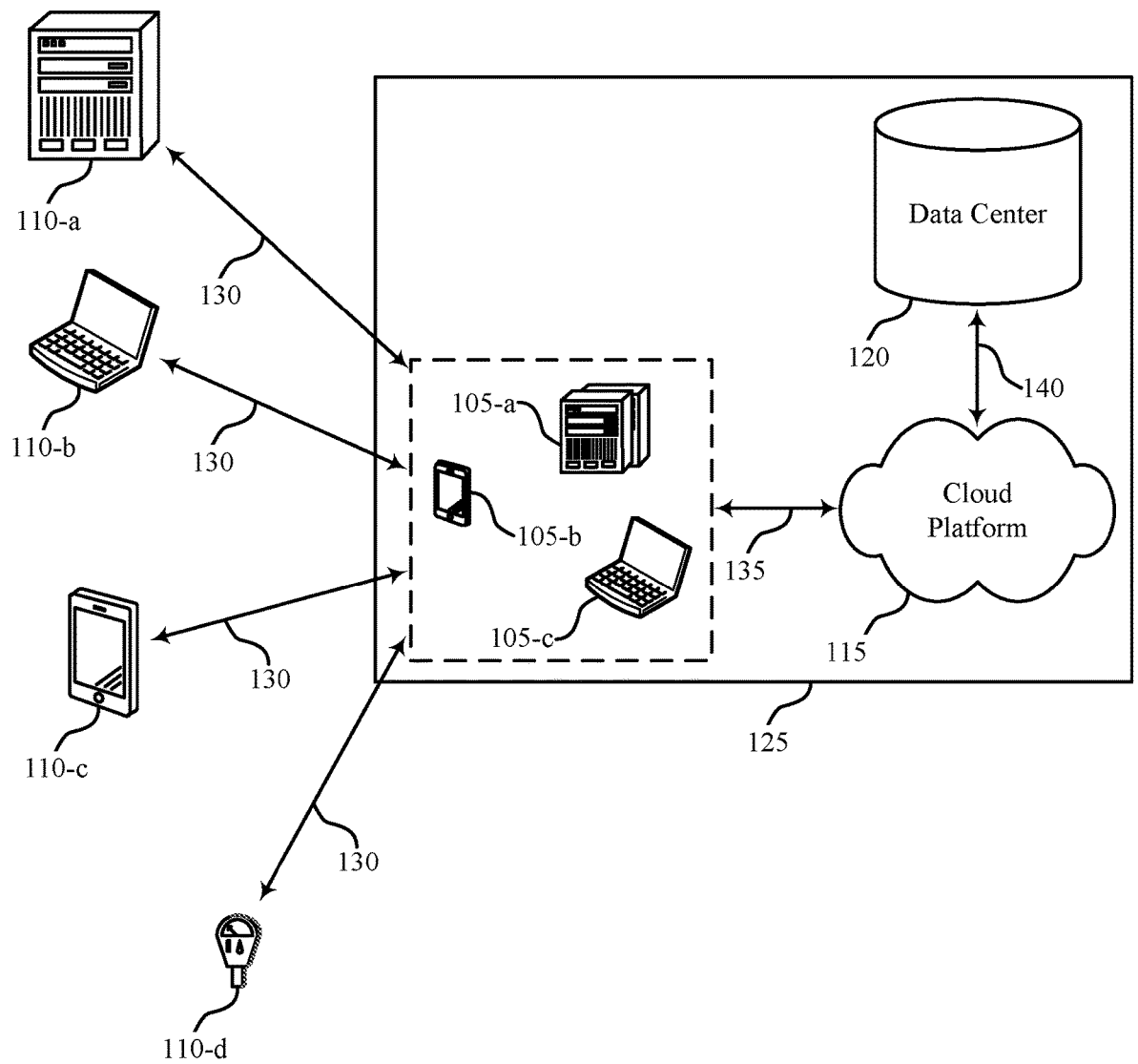
FIGS. 1 through 3 illustrate examples of computing environments that support techniques for data object generation in accordance with one or more aspects of the present disclosure.

In some organizations, users may track various sales metrics, growth trends, customer interaction rates, and other information to assess the performance of an organization or a sub-group within the organization. In some cases, a user may share performance-related data with other users in the organization via slide decks, message communications, images, charts, presentations, or the like. These deliverables may enable recipient users to quickly visualize the data and evaluate the performance of the organization without interacting with the raw (unprocessed) data. In some cases, however, the process of creating these deliverables may be error-prone, time-consuming, and manually intensive. For example, a user may be required to import data to a first (auxiliary) file, format and process the data within the first file, transfer the processed data to a second (deliverable) file, and reformat the processed data within the second file.

The techniques described herein may enable users to create data objects (e.g., dynamic content items such as presentations, slides, posts, documents) with greater efficiency and reduced manual interaction by automating the process of importing, processing, and transferring data between different files. More specifically, the described techniques may enable users to upload templates to a shared dataspace such that a data service (also referred to as a slides service or a dynamic content generation service) can use the uploaded templates to automatically import, transfer, and format subsequent data sets provided by a user. The data service may, in some cases, prompt a user to provide credentials (username, password, security key), register templates, and configure one or more export settings before the user can access the data service. The user may execute these tasks via a user interface configured for the data service.

As an example, the data service may receive an application programming interface (API) request that indicates a deliverable template (equivalently referred to as a first template), an auxiliary template (referred to herein as a second template), a target (selected) data set, and one or more user identifiers. Upon receiving the API request, the data service may retrieve the deliverable template and the auxiliary template from a template library that includes multiple templates stored in association with different clients of the data service. The deliverable template may include one or more variables (e.g., placeholder values), while the auxiliary template may include a mapping between the one or more variables in the deliverable template and one or more fields from the target data set. Once both templates are retrieved, the data service may generate a dynamic content item (also referred to as a data object) by importing the one or more fields from the target data set to the auxiliary template and linking the auxiliary template to the deliverable template in accordance with the mapping between the one or more variables in the deliverable template and the one or more fields in the target data set. Accordingly, the data service may transmit an API response that includes an identifier of the dynamic content item (e.g., a link to the dynamic content item), which may be accessible to the one or more user identifiers indicated by the API request.

In some examples, the API request may include a JavaScript Object Notation (JSON) payload that includes an identifier of the deliverable template, an identifier of the auxiliary template, an indication of a comma-separated values (CSV) file that includes the target data set, and email addresses associated with one or more users. The data service may use this information to retrieve the corresponding templates, import the target data set, and share the resulting content with the one or more users. In some examples, the data service may be integrated with different client systems or organizations. As such, different instances of the data service may have different configurations and settings. For example, one or more user interface elements, templates, delivery schemes, or feedback mechanisms of the data service may vary between client systems.

Aspects of the present disclosure may be implemented to realize one or more of the following advantages. The data service described herein may enable users to generate and share content items (presentations, slides, documents, posts) with greater efficiency, reduced manual interaction, and fewer errors by automating the process of importing data from a CSV file to an auxiliary template, mapping the imported data from the auxiliary template to a deliverable template, and sharing the deliverable template with other users. Moreover, the data service described herein may be configured as a microservice that is locally hosted within a computing environment (in contrast to other Software-as-a-Service (SaaS) deployments that use third-party software and applications), which may reduce the likelihood of data being exposed, stolen, or corrupted while using the data service.

Aspects of the disclosure are initially described in the context of computing environments, system diagrams, user interfaces, and process flows. Aspects of the disclosure are further illustrated by and described with reference to apparatus diagrams, system diagrams, and flowcharts that relate to techniques for data object generation.

FIG. 1 illustrates an example of a computing environment 100 that supports techniques for data object generation in accordance with various aspects of the present disclosure. The computing environment 100 includes client devices 105, contacts 110, a cloud platform 115, and a data center 120. The cloud platform 115 may be an example of a public or private cloud network. A client device 105 may access the cloud platform 115 over a network connection 135. The network connection 135 may be established via a transfer control protocol and internet protocol (TCP/IP), such as the Internet, or another network protocol. A client device 105 may be an example of a user device such as a server (e.g., a client device 105-a), a smartphone (e.g., a client device 105-b), or a laptop (e.g., a client device 105-c). In other examples, a client device 105 may be a desktop computer, a tablet, a sensor, or another computing device or system capable of generating, analyzing, transmitting, or receiving communications. In some examples, a client device 105 may be operated by a user that is part of a business, an enterprise, a non-profit, a startup, or any other organization type.

A client device 105 may perform interactions 130 with one or multiple contacts 110. The interactions 130 may include communications, opportunities, purchases, sales, or any other interaction between a client device 105 and a contact 110. Data may be associated with the interactions 130. A client device 105 may access the cloud platform 115 to store, manage, and process the data associated with the interactions 130. In some cases, the client device 105 may have an associated security or permission level. A client device 105 may have access to certain applications, data, and database information within the cloud platform 115 based on the associated security or permission level, and may not have access to others.

Contacts 110 may interact with the client device 105 in person or via phone, email, web, text messages, mail, or any other appropriate form of interaction. An interaction 130 may be a business-to-business (B2B) interaction or a business-to-consumer (B2C) interaction. A contact 110 may also be referred to as a customer, a potential customer, a lead, a client, or some other suitable terminology. In some cases, a contact 110 may be an example of a user device such as a server (e.g., the contact 110-a), a laptop (e.g., the contact 110-b), a smartphone (e.g., the contact 110-c), or a sensor (e.g., the contact 110-d). In other cases, a contact 110 may be another computing system. In some cases, a contact 110 may be operated by a user or group of users. The user or group of users may be associated with a business, a manufacturer, or any other appropriate organization.

The cloud platform 115 may offer an on-demand database service to client devices 105. In some cases, the cloud platform 115 may be an example of a multi-tenant database system. For example, the cloud platform 115 may serve multiple client devices 105 with a single instance of software. However, other types of systems may be implemented, including—but not limited to—client-server systems, mobile device systems, and mobile network systems. In some cases, the cloud platform 115 may support customer relationship management (CRM) solutions. This may include support for sales, service, marketing, community, analytics, applications, and the Internet of Things. The cloud platform 115 may receive data associated with interactions 130 from client devices 105 over the network connection 135, and may store and analyze the received data. In some cases, the cloud platform 115 may receive data directly from an interaction 130 between a contact 110 and a client device 105. In some cases, a client device 105 may develop applications to run on the cloud platform 115. The cloud platform 115 may be implemented using remote servers. In some cases, the remote servers may be located at one or more data centers, such as the data center 120.

The data center 120 may include one or multiple servers. The multiple servers may be used for data storage, management, and processing. The data center 120 may receive data from the cloud platform 115 via a connection 140, via a client device 105, or via an interaction 130 between a contact 110 and a client device 105. The data center 120 may utilize multiple redundancies for security purposes. In some cases, data stored at the data center 120 may be copied and backed up at a different data center (not pictured).

A sub-system 125 of the computing environment 100 may include client devices 105, the cloud platform 115, and the data center 120. In some cases, data processing may occur at any of the components of the sub-system 125, or at a combination of these components. In some cases, servers may perform the data processing. These servers may be examples of a client device 105 or the data center 120.

In accordance with aspects of the present disclosure, a data service supported by or configured for one or more of the client devices 105 may receive an API request that indicates a first template (e.g., a deliverable template), a second template (e.g., an auxiliary template), a data set, and one or more user identifiers, where the first template includes one or more variables, the data set includes information from a database (e.g., the data center 120) that is inaccessible to the data service, and the second template includes a mapping between the one or more variables in the first template and one or more fields in the data set. The data service may retrieve the first template and the second template from a template library that includes multiple templates stored in association with different client devices 105 of the data service. Accordingly, the data service may generate a data object (e.g., a dynamic content item) by importing the one or more fields from the data set to the second template and linking the second template to the first template in accordance with the mapping between the one or more variables and the one or more fields. The data service may then transmit an API response that includes an identifier of the data object that is accessible to the one or more user identifiers.

Aspects of the computing environment 100 may be implemented to realize one or more of the following advantages. The techniques and operations described with reference to FIG. 1 may enable the client devices 105 to generate and share data objects (presentations, slides, documents, posts) with greater efficiency, reduced manual interaction, and fewer errors by automating the process of importing data from a CSV file to an auxiliary template, mapping the imported data from the auxiliary template to a deliverable template, and sharing the deliverable template with other client devices 105. Moreover, the services and functions described herein may be provided via a microservice that is locally hosted within the computing environment 100 (in contrast to other SaaS deployments that use third-party software and applications), which may reduce the likelihood of data being exposed, stolen, or corrupted while using the data service.

It should be appreciated by a person skilled in the art that one or more aspects of the disclosure may be implemented in a system, such as the computing environment 100, to solve problems other than those described above. Furthermore, aspects of the disclosure may provide technical improvements to "conventional" systems or processes, as described herein. However, the description and appended drawings only include example technical improvements resulting from implementing aspects of the disclosure, and accordingly do not represent all of the technical improvements provided within the scope of the claims.

Figure 2:
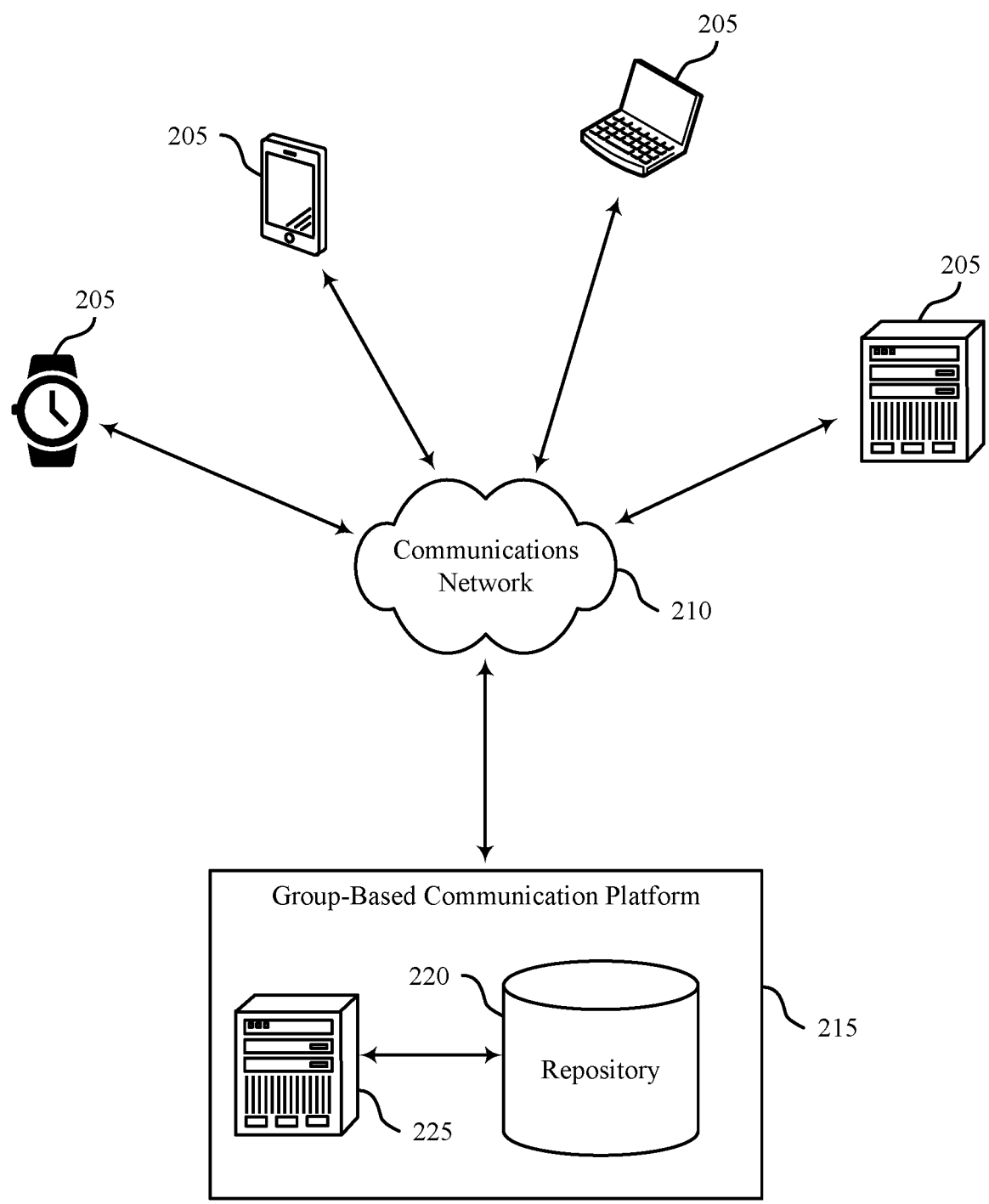

FIG. 2 illustrates an example of a computing environment 200 that supports techniques for data object generation in accordance with one or more aspects of the present disclosure. The computing environment 200 may implement or be implemented by one or more aspects of the computing environment 100. For example, the computing environment 200 includes client device 205, which may be examples of client devices 105 or contacts 110 described with reference to FIG. 1. In the computing environment 200, users may access a group-based communication platform 215 via a communications network 210 using client devices 205. The group-based communication platform 215 may include a group-based communication server 225 in communication with at least one group-based communication repository 220.

The communications network 210 may include any wired or wireless communication network including, for example, a wired or wireless local area network (LAN), personal area network (PAN), metropolitan area network (MAN), or a wide area network (WAN), as well as any hardware, software, or firmware used to implement the network (e.g., network routers). The communications network 210 may include a cellular telephone, an 802.11, 802.16, 802.20, and/or WiMAX network. Further, the communications network 210 may include a public network (such as the Internet), a private network (such as an intranet), or combinations thereof, and may utilize a variety of networking protocols now available or later developed including, but not limited to, TCP/IP-based networking protocols. The networking protocol may be customized to suit the needs of the group-based communication platform 215. In some examples, the networking protocol is a protocol supporting communication of JSON payloads via a Web socket channel. In some examples, the protocol may include JSON-remote procedure call (RPC), JSON-representational state transfer (REST), JSON-hypertext transfer protocol (HTTP), JSON-HTTP secure (HTTPs), or the like.

The group-based communication server 225 may be embodied as a computer or computers, as is well known in the art. The group-based communication server 225 may operate as a security apparatus for the group-based communication platform 215. The group-based communication server 225 may support reception of electronic data from various sources, including (but not limited to) the client devices 205. For example, the group-based communication server 225 may be configured to receive and post or transmit group-based messaging communications provided by the client devices 205.

The group-based communication repository 220 may be implemented as a data storage device such as a Network-Attached Storage (NAS) device, or as a separate database server. The group-based communication repository 220 may include information accessed and stored by the group-based communication server 225 to facilitate operations of the group-based communication platform 215. For example, the group-based communication repository 220 may include, without limitation, a number of messaging communications organized amongst one or multiple group-based communication channels.

The client devices 205 may be examples of any of the computing devices described herein. Electronic data received by the group-based communication server 225 (from the client devices 205) may be provided in various forms and using various methods. For example, the client devices 205 may include desktop computers, laptop computers, smartphones, netbooks, tablet computers, wearables, and the like. In examples where a client device 205 is a mobile device, such as a smart phone or tablet, the client device 205 may execute an application ("app") to interact with the group-based communication platform 215. Such applications may be typically designed to execute on mobile devices, such as tablets or smartphones. For example, an application may be provided that executes on mobile device operating systems such as iOS®, Android®, or Windows® or a on a web browser (e.g., a web app).

These platforms typically provide frameworks that allow applications to communicate with one another and with particular hardware and software components of mobile devices. For example, the mobile operating systems named above each provide frameworks for interacting with location services circuitry, wired and wireless network interfaces, user contacts, and other applications. Communication with hardware and software modules executing outside of the application is typically provided via APIs provided by the mobile device operating system. Additionally or alternatively, the client devices 205 may interact with the group-based communication platform 215 via a web browser. As yet another example, the client device 205 may include various hardware or firmware designed to interface with the group-based communication platform 215.

In some examples, a messaging communication may be sent from one or more of the client devices 205 to the group-based communication platform 215. In various implementations, the message communication may be sent from a client device 205 to the group-based communication platform 215 via the communications network 210. Additionally, or alternatively, a message communication may be sent from a client device 205 to the group-based communication platform 215 via an intermediary, such as a message server. As described herein, the client devices 205 may include one or more of a desktop, a laptop, a tablet, a smartphone, or a similar computing device executing a client application (e.g., a group-based communication application). In one implementation, a message communication may include data such as a message identifier, a sending user identifier, a group identifier, a group-based communication channel identifier, message contents (e.g., text, emojis, images, links), attachments (e.g., files), message hierarchy data (e.g., if the message communication is a reply to another message communication), third party metadata, etc.

The group-based communication platform 215 may include at least one group-based communication server 225, which may generate a storage message (based on a received message communication) to facilitate message indexing and storage in the group-based communication repository 220. In one implementation, the storage message may include data such as a message identifier, a group identifier, a group-based communication channel identifier, a sending user identifier, topics, responses, message contents, attachments, message hierarchy data, third party metadata, or conversation primitive data, among other examples. The group-based communication server 225 may provide a storage message in the form of an HTTP POST message that includes extensible markup language (XML)-formatted data.

In one implementation, a message communication may be parsed (e.g., using hypertext preprocessor (PHP) commands) to determine an identifier of a user that sent the message communication. In some cases, topics may be associated with a message communication. In one implementation, the message contents may be parsed (e.g., using PHP commands) to determine topics discussed in the message communication. For example, hashtags in the message communication may indicate topics associated with the message communication. In another example, the message communication may be analyzed (e.g., alone or with other message communications in a conversation primitive) or parsed using a machine learning technique (such as topic modeling) to determine topics associated with the message communication.

In some examples, one or more responses may be associated with a message communication. Exemplary responses to a message communication may include reactions (e.g., selection of an emoji associated with the message communication, selection of a "like" button associated with the message communication), clicking on a hyperlink embedded in the message communication, replying to the message communication (e.g., posting a message to the group-based communication channel in response to the message communication), downloading a file associated with the message communication, sharing the message from one group-based communication channel to another group-based communication channel, pinning the message communication, starring the message communication, and/or the like. In one implementation, responses to a message communication may be included with the message communication, and the message communication may be parsed (e.g., using PHP commands) to determine the responses.

In some implementations, responses to a message communication may be retrieved from a database (such as the data center 120 described with reference to FIG. 1). In some examples, responses to a message communication may be retrieved via a MySQL database command. Responses to a message communication may be used to determine a context of the message communication (e.g., a social score for the message, from the perspective of a user). In another example, responses to a message communication may be analyzed to determine the context of a user (e.g., the expertise level of the user in a topic may be determined based on responses to a message communication from the user regarding the topic). In some examples, attachments may be included with a message communication. If there are attachments, files may be associated with the message communication.

In some implementations, the message communication may be parsed (e.g., using PHP commands) to determine file names of the attachments. For example, file contents may be analyzed to determine context for the message communication (e.g., a patent policy document may indicate that a message communication is associated with the topic "patents"). In some examples, third-party metadata may be associated with the message communication. For example, third-party metadata may provide additional context regarding a message communication or a user associated with a company, group, group-based communication channel, and/or the like. In some implementations, a message communication may be parsed (e.g., using PHP commands) to determine third-party metadata. For example, third-party metadata may indicate whether a user that sent a message communication is an authorized representative of the group-based communication channel, where an authorized representative refers to an individual that is authorized by the company to respond to questions in the group-based communication channel.

In some examples, a conversation primitive may be associated with a message communication. In some implementations, a conversation primitive is an element used to analyze, index, or store message communications. For example, a message communication may be analyzed individually, and may form an independent conversation primitive. In another example, a message communication may be analyzed along with other message communications in a conversation. Thus, message communications from the conversation may also form a conversation primitive. In some implementations, a conversation primitive may include a message communication, a specified number (e.g., two) of preceding message communications, and a specified number (e.g., two) of following message communications. Additionally, or alternatively, a conversation primitive may be determined based on an analysis of topics discussed in the message communication and other message communications (e.g., within a group-based communication channel) and/or the proximity of these message communications.

In some examples, various metadata and/or contents of a message communication may be used to index the message communication (e.g., using a conversation primitive) to facilitate various search functionalities (e.g., search queries that return results from the group-based communication repository 220). In some implementations, a storage message may be sent from the group-based communication server 225 to facilitate indexing in the group-based communication repository 220. Additionally, or alternatively, metadata associated with the message communication may be determined, and the message communication may be indexed in the group-based communication repository 220.

In some examples, a message communication may be indexed such that message communications associated with a company or group are indexed separately (e.g., in a separate index associated with the group and/or company that is not shared with other groups and/or companies). In some cases, message communications may be indexed in a separate distributed repository (e.g., to facilitate data isolation for security purposes). If there are attachments associated with a message communication, file contents of the associated files may be used to index such files in the group-based communication repository 220 to facilitate various search functionalities. In some examples, these files may be indexed such that the files of a company or group are indexed at a separate distributed repository.

In accordance with the techniques described herein, a data service integrated with or otherwise supported by the group-based communication platform 215 may receive an API request that indicates a first template, a second template, a data set, and one or more user identifiers, where the first template includes one or more variables, the data set includes information from a database (e.g., the data center 120 described with reference to FIG. 1) that is inaccessible to the data service, and the second template includes a mapping between the one or more variables in the first template and one or more fields in the data set. The data service may retrieve the first template and the second template from a template library that includes multiple templates stored in association with different clients of the data service (e.g., the client devices 205). Accordingly, the data service may generate a data object (e.g., a dynamic content item) by importing the one or more fields from the data set to the second template and linking the second template to the first template in accordance with the mapping between the one or more variables and the one or more fields. The data service may then transmit an API response that includes an identifier of the data object that is accessible to the one or more user identifiers.

Aspects of the computing environment 200 may be implemented to realize one or more of the following advantages. The techniques and operations described with reference to FIG. 1 may enable the client devices 205 to generate and share data objects of various types (presentations, slides, documents, posts) with greater efficiency, reduced manual interaction, and fewer errors by automating the process of importing data from a CSV file to an auxiliary template, mapping the imported data from the auxiliary template to a deliverable template, and sharing the deliverable template with other client devices 205. Moreover, the services and functions described herein may be locally hosted within the computing environment 200 (in contrast to other SaaS deployments that use third-party software and applications), which may reduce the likelihood of data being exposed, stolen, or corrupted while using the data service.

Figure 3:
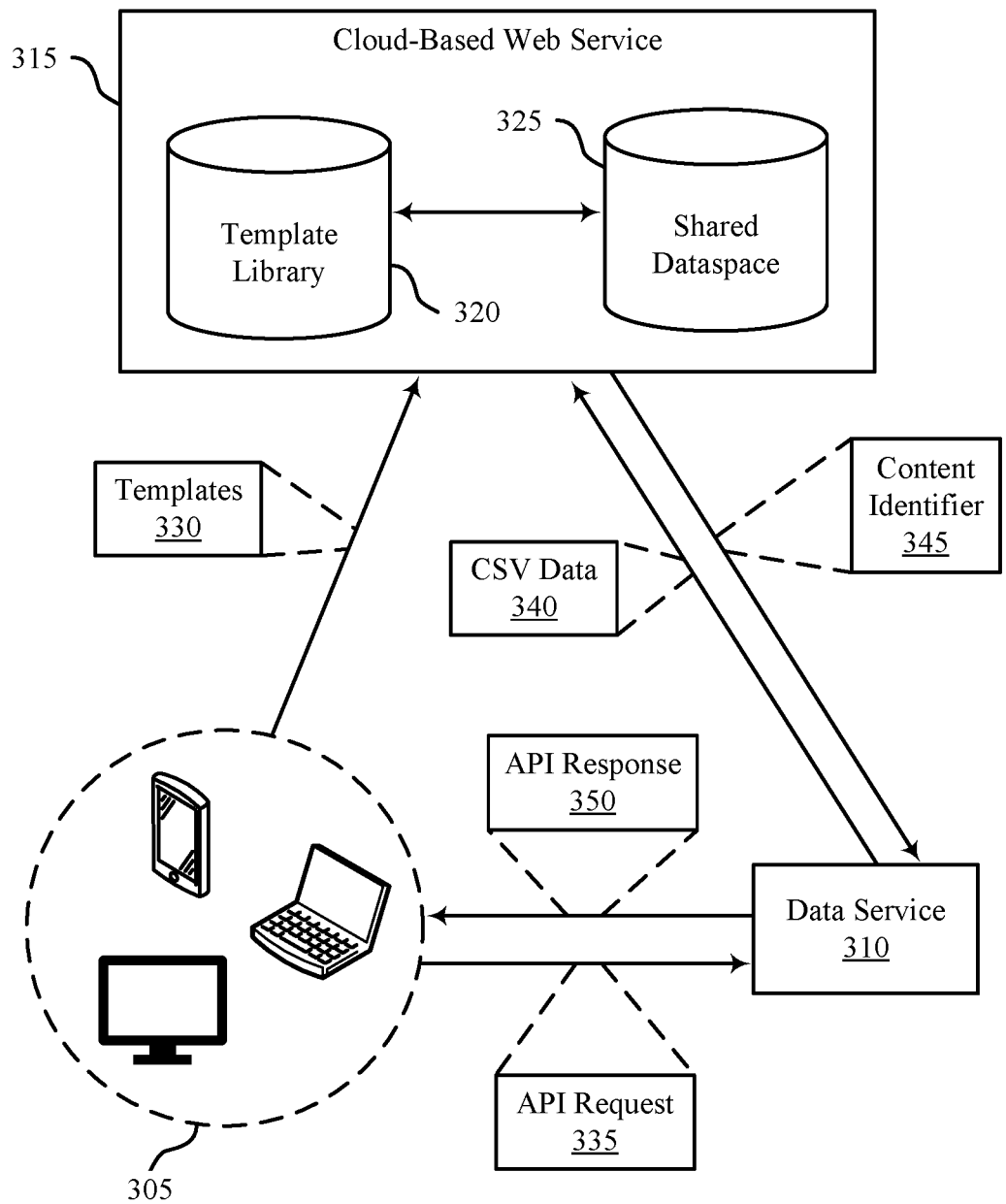

FIG. 3 illustrates an example of a computing environment 300 that supports techniques for data object generation in accordance with one or more aspects of the present disclosure. The computing environment 300 may implement or be implemented by aspects of the computing environment 100 or the computing environment 200. For example, the computing environment 300 includes client devices 305, which may be examples of client devices 205 or client devices 105, as described with reference to FIGS. 1 and 2. The computing environment 300 also includes a data service 310, which may be hosted by or integrated with one or both of the cloud platform 115 or the group-based communication platform 215, as described with reference to FIGS. 1 and 2.

In the example of FIG. 3, the client devices 305 may interact with the data service 310 and a cloud-based web service 315 via one or more APIs. For example, one or more of the client devices 305 may upload one or more templates 330 (which may include deliverable templates and auxiliary templates) to a template library 320 hosted or managed by the cloud-based web service 315. The template library 320 may include various templates stored in association with different clients of the data service 310. In some examples, templates associated with different client devices 305 may be stored in separate repositories or folders within the template library 320. After uploading the templates 330 to the template library 320, the client devices 305 may register the templates 330 with the data service 310.

In some examples, the data service 310 may employ security measures to ensure that only authorized individuals are able to access the data service 310. For example, users of the client devices 305 may be presented with a login page after installing the data service 310 or attempting to run the data service 310 for the first time. Once the initial onboarding process is complete, users of the client devices 305 may access the data service 310 by means of a user interface, such as the user interface 600 described with reference to FIG. 6A. In some examples, this user interface may be customized or configured for a specific tenant, user, device, client system, organization, business unit, or the like. For example, some export options or display features may be enabled or disabled for different clients of the data service 310. In some examples, the data service 310 may be integrated with another application or platform (such as the group-based communication platform 215) using a microservice architecture. As such, the data service 310 can be locally hosted within the infrastructure of a company or organization, which may reduce the likelihood of sensitive data being exposed or stolen while using the data service 310.

As described herein with reference to FIGS. 1 and 2, a user of a client device 305 may access the data service 310 by means of an API provided by the data service 310. For example, a user of a client device 305 may transmit an API request 335 that includes an indication of CSV data 340 (e.g., a target data set), a deliverable template (e.g., a slide deck), an auxiliary template (e.g., a spreadsheet), and identifying information (e.g., email addresses) for one or more recipient users. The data service 310 may use the information from the API request 335 to locate the relevant templates within the template library 320. After retrieving both templates from the template library 320, the data service 310 may upload copies of the templates to a shared dataspace 325. In some examples, the template library 320 and the shared dataspace 325 may be hosted or managed by the cloud-based web service 315. In other examples, however, one or both of the template library 320 or the shared dataspace 325 may be hosted locally (e.g., without third-party software and applications) on one or more servers associated with a client of the data service 310.

Accordingly, the data service 310 may import the CSV data 340 to the copy of the auxiliary template (within the shared dataspace 325) and process the imported data according to various mappings defined in the auxiliary template. The client devices 305 can provide the data service 310 with data from any data source so long as the data can be represented in CSV format. The CSV data 340 may include performance-related data, sales metrics, growth trends, internal data, etc. In some implementations, the CSV data 340 may include information from a client database that is inaccessible to the data service 310 by other means. Creating a layer of abstraction between the data service 310 and clients of the data service 310 (for example, by limiting the ability of the data service 310 to interact with client data) may improve the overall security of the data service 310 (in comparison to other SaaS products that require direct access to client data) and enable clients to control what data is exposed to the data service 310, thereby improving security of the client data.

After the CSV data 340 has been successfully processed, the data service 310 may link the resulting information (charts, values, graphs) to corresponding variable locations in the deliverable template (e.g., the copy of the deliverable template saved to the shared dataspace 325) and configure one or more privacy settings of the deliverable template such that the dynamically generated content is accessible to the one or more recipient users indicated by the API request 335. Accordingly, the data service 310 may obtain an identifier 345 of the dynamic content item (e.g., a link to the copy of the deliverable template within the shared dataspace 325) and transmit an API response 350 that includes the identifier 345 and a notification that the dynamic content item has been successfully created. If, for example, a user of a client device 305 clicks or otherwise interacts with the identifier 345, the client device 305 may be directed to the location of the dynamic content item within the shared dataspace 325. In some examples, the dynamic content item may be formatted such that users can view the underlying auxiliary template from which the resulting data was derived (for example, by clicking or selecting a link within the dynamic content item).

Figure 4:
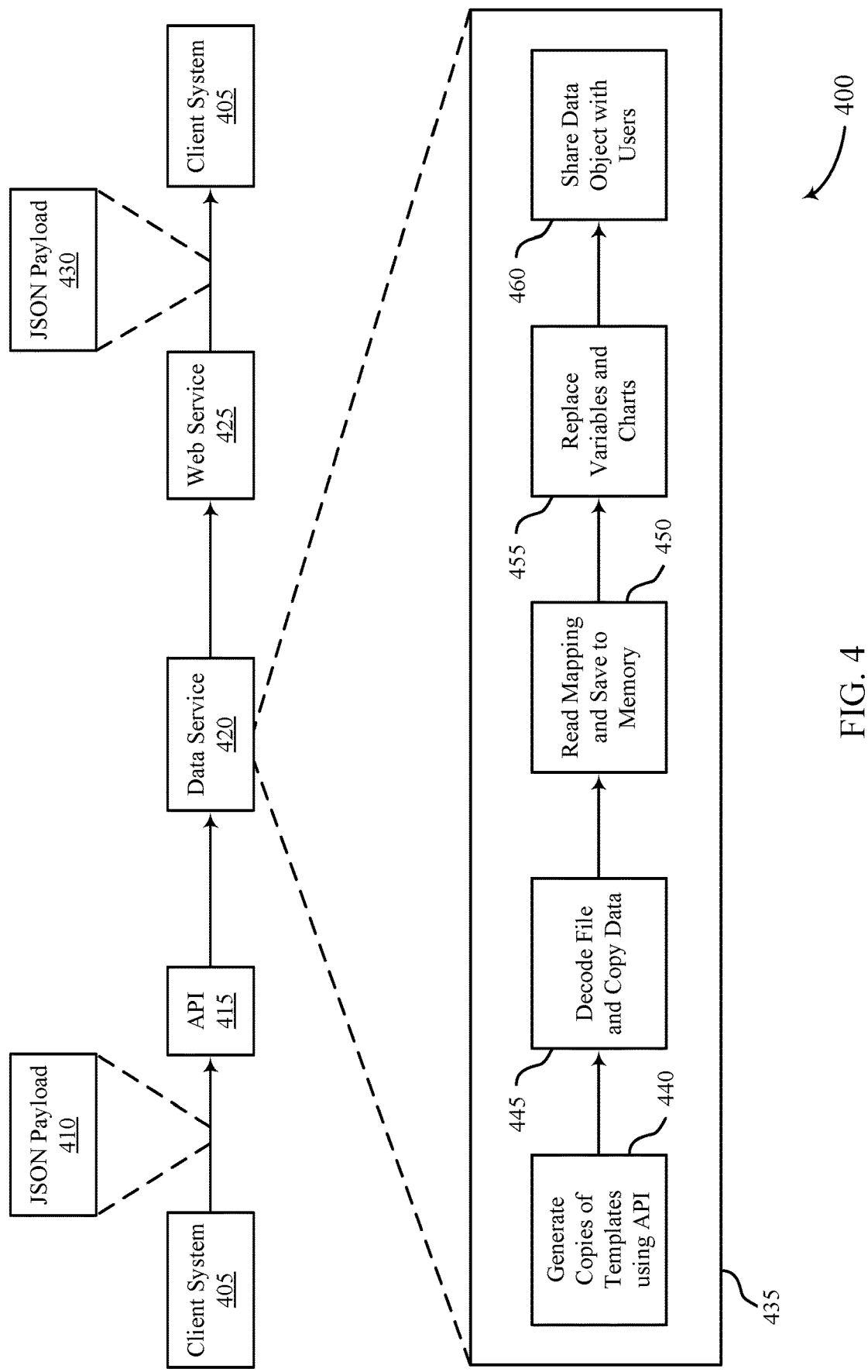
FIG. 4 illustrates an example of a system diagram that supports techniques for data object generation in accordance with one or more aspects of the present disclosure.

FIG. 4 illustrates an example of a system diagram 400 that supports techniques for data object generation in accordance with one or more aspects of the present disclosure. The system diagram 400 may implement or be implemented by aspects of any of the computing environments described with reference to FIGS. 1 through 3. For example, the system diagram 400 includes a data service 420, which may be an example of the data service 310 described with reference to FIG. 3. The system diagram 400 also includes a client system 405, which may include one or more of the client devices 305 described with reference to FIG. 3. As illustrated in the system diagram 400, the data service 420 may generate a data object (e.g., a dynamic content item) in response to an API request from the client system 405.

In the example of FIG. 4, the client system 405 (also referred to as a source system or a service client) may transmit a JSON payload 410 to the data service 420 via an API 415 provided by the data service. In some examples, the API 415 may be integrated with one or more applications or services supported by the client system 405. For example, the API 415 may be integrated with a group-based communication platform (e.g., the group-based communication platform 215 described with reference to FIG. 2) using a microservice architecture. As described herein, a microservice architecture may refer to a software development scheme in which software (applications and services) is comprised of smaller independent services (such as the data service 420) that communicate using established or predefined APIs (such as the API 415). Using a microservice architecture may enable software developers to scale, develop, iterate, and deploy the data service 420 with greater efficiency, fewer compatibility issues, improved data security, etc.

The JSON payload 410 sent from the client system 405 may indicate one or more template identifiers, an indication of a Base64-encoded CSV file (e.g., a target data set), and a list of emails to which the data object should be distributed or otherwise made accessible. As described herein, Base64 may refer to a binary-to-text encoding scheme where binary data in sequences of 24 bits can be represented using four 6-bit Base64 digits. Base64 can be used to convey data stored in binary formats across channels that support text content, which may be useful for embedding image files or other binary assets inside textual assets (such as hypertext markup language (HTML) and cascading style sheets (CSS) files), sending and receiving email attachments, etc.

After receiving the JSON payload 410 from the client system 405 via the API 415, the data service 420 may perform one or more operations of a method 435 using, for example, one or more computational resources (servers, devices, data centers) provided by the client system 405. At 440, the data service 420 may copy a deliverable template (e.g., a slide deck) and an auxiliary template (e.g., a spreadsheet) to new files using an API provided by a cloud-based web service. The data service 420 may retrieve the deliverable template and the auxiliary template from a template library (such as the template library 320 described with reference to FIG. 3) using the template identifiers in the JSON payload 410. In some examples, the template library may be hosted by a cloud-based web service, such as the cloud-based web service 315 described with reference to FIG. 3.

At 445, the data service 420 (or components thereof) may decode a ZIP file (or other archive file format) that includes the target CSV data (e.g., the Base64-encoded CSV file) and copy the decoded CSV data into various sections (tabs) within the auxiliary template. At 450, the data service 420 may read a data mapping from one or more mapping sections within the auxiliary template and save the data mapping to a location in memory. At 455, the data service 420 may replace variables and charts in the deliverable template with mapped values from the CSV data imported to the auxiliary template. At 460, the resulting data object may be shared with the list of emails from the JSON payload 410. In some examples, the data service 420 may share the resulting data object with the specified email addresses using an API provided by a cloud-based web service.

Once the data service 420 has successfully generated the requested data object, the data service 420 may invoke a web service 425 to notify the client system 405. For example, the data service 420 may provide the web service 425 with an identifier of the requested data object (e.g., a link to the data object), which the web service 425 may convey to the client system 405 in the form of a JSON payload 430. In some examples, the JSON payload 430 may also include a list of users that can access the data object, information extracted from the data object, etc. Although the JSON payload 430 is depicted as being communicated from the data service 420 to the client system 405 by means of the web service 425, it is to be understood that, in some implementations, the client system 405 may obtain the JSON payload 430 directly from the data service 420 (e.g., without any intervening third-party applications or software).

Figure 5A:
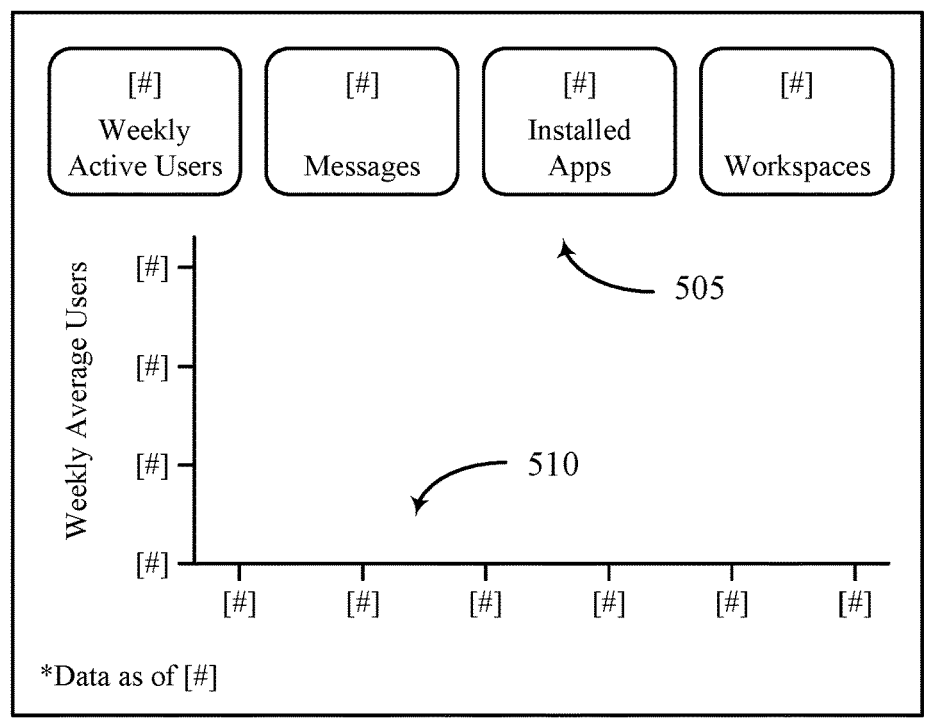
FIGS. 5A and 5B illustrate examples of content diagrams that support techniques for data object generation in accordance with one or more aspects of the present disclosure.
Figure 5B:
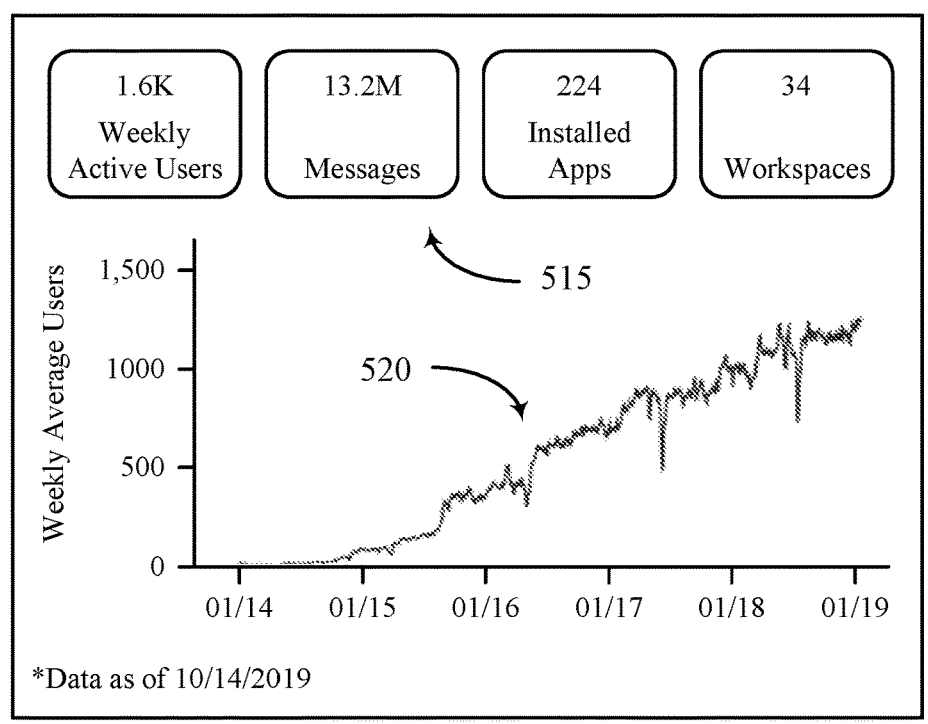

FIGS. 5A and 5B illustrate examples of a content diagram 500 and a content diagram 501 that support techniques for data object generation in accordance with one or more aspects of the present disclosure. One or both of the content diagram 500 or the content diagram 501 may implement or be implemented by aspects of any of the computing environments or system diagrams described with reference to FIGS. 1 through 4. For example, the content diagram 500 and the content diagram 501 may be examples of a deliverable template (or a portion thereof) to which values from an auxiliary template are mapped. The content diagram 500 may illustrate a state of the deliverable template before the data mapping process, while the content diagram 501 may illustrate a state of the deliverable template after the auxiliary template is linked to the deliverable template.

As described with reference to FIGS. 1 through 4, a data service integrated with or otherwise supported by one or more client applications may receive an API request that indicates the deliverable template, an auxiliary template, a data set, and one or more user identifiers, where the deliverable template includes one or more variables 505 and charts 510, the data set includes information from a database that is inaccessible to the data service, and the auxiliary template includes a mapping between the one or more variables 505 and charts 510 in the deliverable template and one or more values in the data set. In some examples, the data service may suggest or recommend a deliverable template to a user based on characteristics (values, labels, field names) of the data set, other deliverable templates designed by the user, similar templates developed by other users, a user-selected data object type (presentation, document, image), etc.

The data service may retrieve the deliverable template and the auxiliary template from a template library (e.g., the template library 320 described with reference to FIG. 3) that includes multiple templates stored in association with different clients of the data service. Accordingly, the data service may generate a data object by importing the one or more values from the data set to the auxiliary template and linking the auxiliary template to the deliverable template in accordance with the mapping. The data service may then transmit an API response that includes an identifier of the data object and a list of users that are authorized to view the data object.

In the example of FIG. 5A, the deliverable template (which may be an example of a slide presentation, a portable document format (PDF), a message communication, an image file, or the like) may include one or more variables 505 and a chart 510, which may be replaced (populated) with corresponding values from a target data set. The deliverable template may also include contextual information (titles, descriptions, references) to accompany the variables 505 and charts 510. In some examples, the deliverable template illustrated in the content diagram 500 may be designed or developed by a user of the data service (e.g., the data service 420 described with reference to FIG. 4). The user may create the deliverable template locally (e.g., using a client device) or using one or more APIs provided by a cloud-based web service.

After the deliverable template is uploaded and registered with the data service, the user may send a Base64-encoded CSV file to the data service via an API (such as the API 415 described with reference to FIG. 4). Accordingly, the data service may decode, import, and process the underlying CSV data in an auxiliary template before mapping the resulting values to corresponding locations in the deliverable template. In the example of FIG. 5B, the variables 505 may be replaced with values 515, while the chart 510 may be populated with values 520. In some examples, the chart 510 may include an interactive link that, if selected, directs the user to a location of the auxiliary template such that the user can view or modify the underlying CSV data.

Aspects of the content diagram 500 and the content diagram 501 may be implemented to realize one or more of the following advantages. The techniques and operations described with reference to FIGS. 5A and 5B may enable client devices (such as the client devices 205 described with reference to FIG. 5) to generate and share data objects (presentations, slides, documents, posts) with greater efficiency, reduced manual interaction, and fewer errors by automating the process of importing data from a CSV file to an auxiliary template, mapping the imported data from the auxiliary template to variables 505 and charts 510 in a deliverable template, and sharing the deliverable template with other client devices. Moreover, the services and functions described herein may be locally hosted within a client system (e.g., the client system 405 described with reference to FIG. 4), which may reduce the likelihood of data being exposed, stolen, or corrupted while using the data service.

Figure 6A:
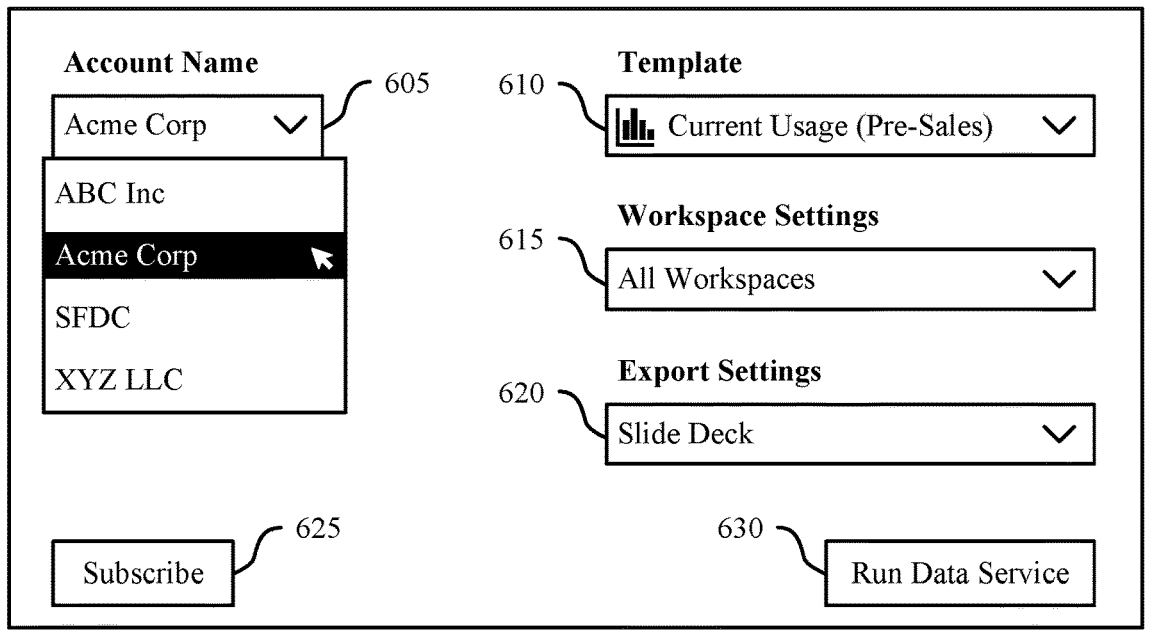
FIGS. 6A and 6B illustrate examples of user interfaces that support techniques for data object generation in accordance with one or more aspects of the present disclosure.
Figure 6B:
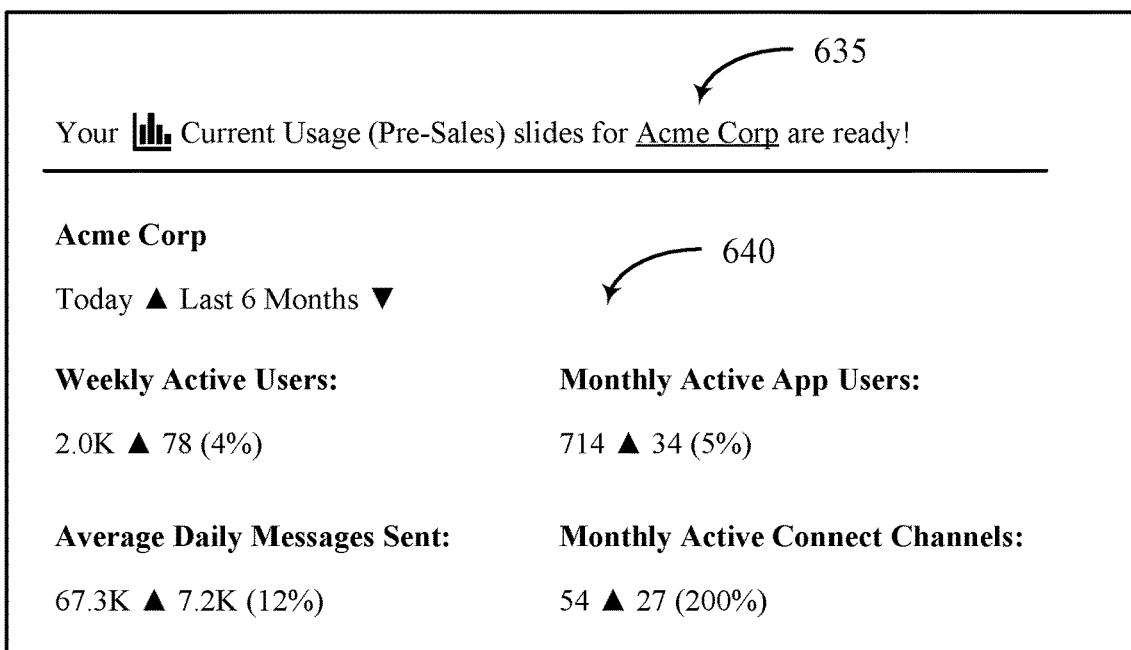

FIGS. 6A and 6B illustrate examples of a user interface 600 and a user interface 601 that support techniques for data object generation in accordance with one or more aspects of the present disclosure. The user interface 600 and the user interface 601 may implement or be implemented by aspects of any of the computing environments, system diagrams, or user interfaces described with reference to FIGS. 1 through 5. For example, the user interface 600 and the user interface 601 may be displayed within a group-based communication channel of a group-based communication platform, such as the group-based communication platform 215 described with reference to FIG. 2. The user interface 600 may illustrate various options and settings for creating and exporting dynamic content items (equivalently referred to as data objects), while the user interface 601 may illustrate an event or notification that includes an identifier 635 of a dynamic content item.

The user interface 600 depicted in the example of FIG. 6A may be presented to a user of a data service (e.g., the data service 310 described with reference to FIG. 3) via a web browser, a software application, or the like. As described herein, the data service (also referred to as a slides service) may be an example of a customized application that enables users and teams within an organization to generate deliverables (slides, documents, files, images) that are populated with data for customer presentations. The data service may be configured for different client systems (e.g., multi-tenant database systems, group-based communication platforms, cloud platforms), organizations, teams, groups, etc. The capabilities and features provided by the data service may be integrated into various workflows and applications used by teams, business units, or other entities within a client domain.

In some examples, the data service may be configured as a microservice that enables various other systems or applications (such as the group-based communication platform 215 or the cloud platform 115 described with reference to FIGS. 1 and 2) to generate slide presentations that include customized data fields. Each application integrated with the data service may be able to register templates with the data service and use the registered templates (along with the accompanying CSV data) to populate slides or other deliverables for client-specific use cases. The data service may be utilized by any organization, business unit, team, or group to generate data-driven slide presentations, messages, documents, files, etc. The data service may be used for any data source that can be represented in CSV format.

In accordance with aspects of the present disclosure, the dynamic content generation functionality supported by the data service may be abstracted into a microservice that is agnostic of any specific data source or delivery mechanism. The data service may be integrated into various systems that are capable of making API calls, and may enable users to select the method of delivery (slides, document, message communication) that is most suitable to the target audience. For example, as illustrated in the user interface 600, a user may select various delivery mechanisms (slide deck, document, email, PDF) within export settings 620. Likewise, the user may configure different workspace options (All Workspaces, Subset of Workspaces) within workspace settings

615. The user may select a deliverable template, such as Current Usage (Pre-Sales), from a list of available templates within template settings 610.

The user interface 600 may include account name settings 605, which may enable users to select a desired account (Acme Corp) from a drop-down menu of possible options. Once a user has selected or configured all desired options and settings shown in the user interface 600, the user may interact with a user interface element 630, which may cause a client device (on which the user interface 600 is displayed) to transmit an API request (along with an accompanying JSON payload) to the data service. The user interface 600 may also include a user interface element 625, which may enable users to receive content-related notifications (signals) from the data service. For example, if the user interface element 625 is selected, a user may receive a post, notification, message, event, or similar indication from the data service when the dynamic content item is ready to be viewed. The user interface 601 illustrates an exemplary notification (event) that may be displayed to a user once the requested content item is complete. In some examples, an event may include metrics 640 or other information extracted from the dynamic content item.

To support the techniques described herein, users of the data service may be prompted to generate deliverable templates (e.g., slide templates, presentation templates, document templates) that include fields and charts represented as variables. Users may also create or otherwise provide the data service with an auxiliary (supporting) template to which CSV data can be copied. The auxiliary template may also include mappings to variables within the deliverable (presentation) template. Once the templates have been created, users may register the templates with the microservice and upload the templates to a suitable location (e.g., a shared folder or any other dataspace accessible to the data service). Users may then configure the export process via the user interface 600 such that data can be imported to the dynamic content item from the source system. As described herein, users of the data service may also be prompted to onboard with credentials prior to accessing the microservice API.

Once these tasks are complete, users (or client systems/devices in response to user action) can make API calls to the data service via the integrated application(s). These API calls may, in some examples, include a JSON payload with template identifiers, CSV data (for inclusion in the dynamic content item), and a list of users to whom the resulting data object (presentation, document, slide deck) should be distributed. The data service (or the computing system(s) supporting the data service) may then generate the requested data object based on the user-provided data mapping, and may return an event with an identifier 635 of the requested data object and/or a link to the underlying auxiliary template (if charts are used). In some examples, the data service may generate the requested data object using an API provided by a cloud-based web service, such as the cloud-based web service 315 described with reference to FIG. 3. The requested data object may be shared with all users indicated by the JSON payload, and may be delivered using various mediums such as email, chat, etc.

In comparison to other software services that support means for creating dynamic content from various data sources, the data service described herein may be implemented without third-party software or applications. For example, the data service may be deployed using a microservice architecture that can be hosted locally (within the infrastructure of a company or organization), thereby enabling users to access the data service without exposing potentially sensitive or confidential information to other systems. The data service described herein may also support a wide array of delivery mechanisms and customization options, enabling various applications to deliver dynamic content without requiring end users to interact with additional SaaS products.

Figure 7:
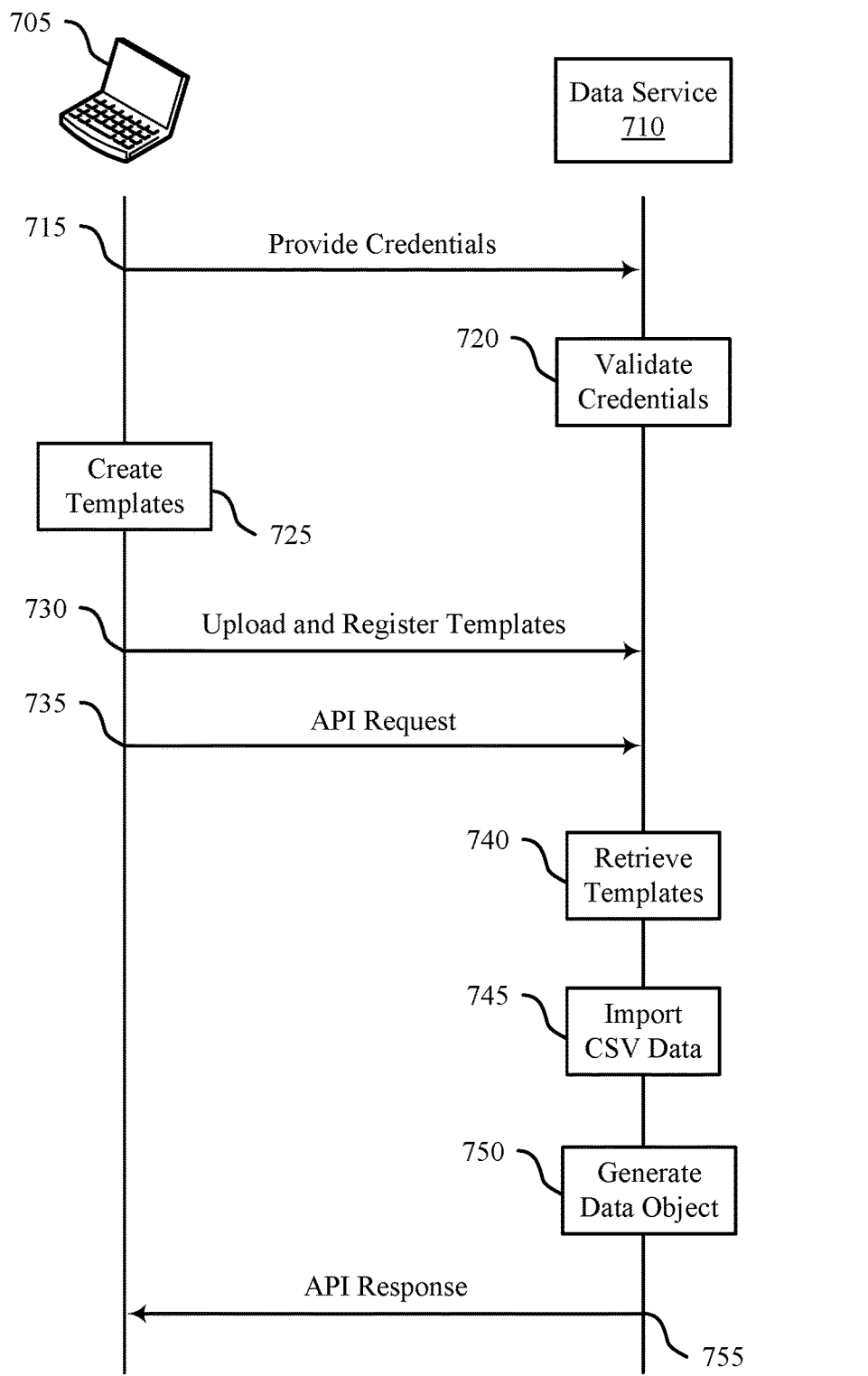
FIG. 7 illustrates an example of a process flow that supports techniques for data object generation in accordance with one or more aspects of the present disclosure.

FIG. 7 illustrates an example of a process flow 700 that supports techniques for data object generation in accordance with one or more aspects of the present disclosure. The process flow 700 may implement or be implemented by aspects of any of the computing environments, system diagrams, or user interfaces described with reference to FIGS. 1 through 6. For example, the process flow 700 includes a client device 705 and a data service 710, which may be examples of corresponding devices and services described with reference to FIGS. 1 through 6. In the following description of the process flow 700, operations between the client device 705 and the data service 710 may be added, omitted, or performed in a different order (with respect to the exemplary order shown).

At 715, a user of the client device 705 may navigate to or be presented with a user interface associated with a data service that supports dynamic content generation. In some examples, the data service may be integrated with another application, such as a group-based communication platform. The user interface presented to the user may, in some examples, be configured for the client device 705 or an organization associated with the client device 705. In some examples (e.g., if the client device 705 is accessing the data service for the first time), the user may be prompted to provide credentials (such as a username, password, or security key) before access to the data service is granted. At 720, the data service may check the credentials provided by the user and authorize the client device 705 if the credentials are valid. Otherwise, the data service may prompt the user to re-enter valid credentials.

At 725, the client device 705 may create one or more deliverable templates and auxiliary templates to facilitate dynamic content generation. As described herein, the deliverable templates may include fields and charts represented with variables, while the auxiliary templates may include a mapping to the variables embedded in the deliverable templates. At 730, the user may register the deliverable templates and auxiliary templates with the data service 710. The user may also upload the deliverable templates and auxiliary templates to a template library that is accessible to the data service 710. In some examples, the template library may be hosted or supported by a cloud-based web service, such as the cloud-based web service 315 described with reference to FIG. 3.

At 735, the data service 710 may receive an API request (e.g., the API request 335 described with reference to FIG. 3) from the client device 705. The API request may indicate one or more of a deliverable template (equivalently referred to as a first template), an auxiliary template (also referred to as a second template), and a target data set for a dynamic content item (e.g., a data object with dynamic properties). As described herein, the target data set may include information from a database that is inaccessible to the data service 710 by other means. The API request may also indicate user identifiers (usernames, email addresses) for one or more recipients of the dynamic content item. In some examples, the API request may include a JSON payload that identifies the deliverable template, the auxiliary template, a base64-encoded CSV file, and a list of email addresses that are permitted to access the dynamic content item.

At 740, the data service 710 may retrieve the deliverable template and the auxiliary template from the template library (e.g., the template library 320 described with reference to FIG. 3), which may include various other deliverable templates and auxiliary templates stored in association with other clients of the data service 710. In some examples, the data service 710 may retrieve the deliverable template and the auxiliary template by using information from the API request to query the template library. Accordingly, the data service 710 may generate copies of both templates and upload the copies of the templates to a shared dataspace accessible to the one or more recipients (e.g., the shared dataspace 325 described with reference to FIG. 3). At 745, the data service 710 may import the data set (e.g., a CSV file) to the copy of the auxiliary template within the shared dataspace.

At 750, the data service 710 may generate the requested data object (e.g., the dynamic content item) by processing the data set within the auxiliary template (more specifically, the copy of the auxiliary template stored in the shared dataspace) and mapping the results (fields, charts, graphs) to corresponding variables in the deliverable template (e.g., the copy of the deliverable template saved to the shared dataspace). The data service 710 may then share the dynamic content item (e.g., the deliverable template populated with data from the auxiliary template) with the one or more recipients by adjusting or configuring various permission settings of the dynamic content item. In some examples, the data service 710 may generate the dynamic content item using one or more APIs provided by a cloud-based web service.

At 755, the data service 710 may transmit an API response to the client device 705. The API response may include an identifier of the dynamic content item (e.g., a link to the deliverable template within the shared dataspace) and a list of users that can access the dynamic content item. In some examples, the data service 710 may include or embed the identifier of the dynamic content item in an event or a notification within a group-based communication channel of a group-based communication platform, such as the group-based communication platform 215 described with reference to FIG. 2. The event or notification may also include elements from the dynamic content item (e.g., statistics, visualizations), a timestamp associated with generation of the dynamic content item, a request for feedback from the user (regarding the performance of the data service 710), or other pertinent information.

Figure 8:
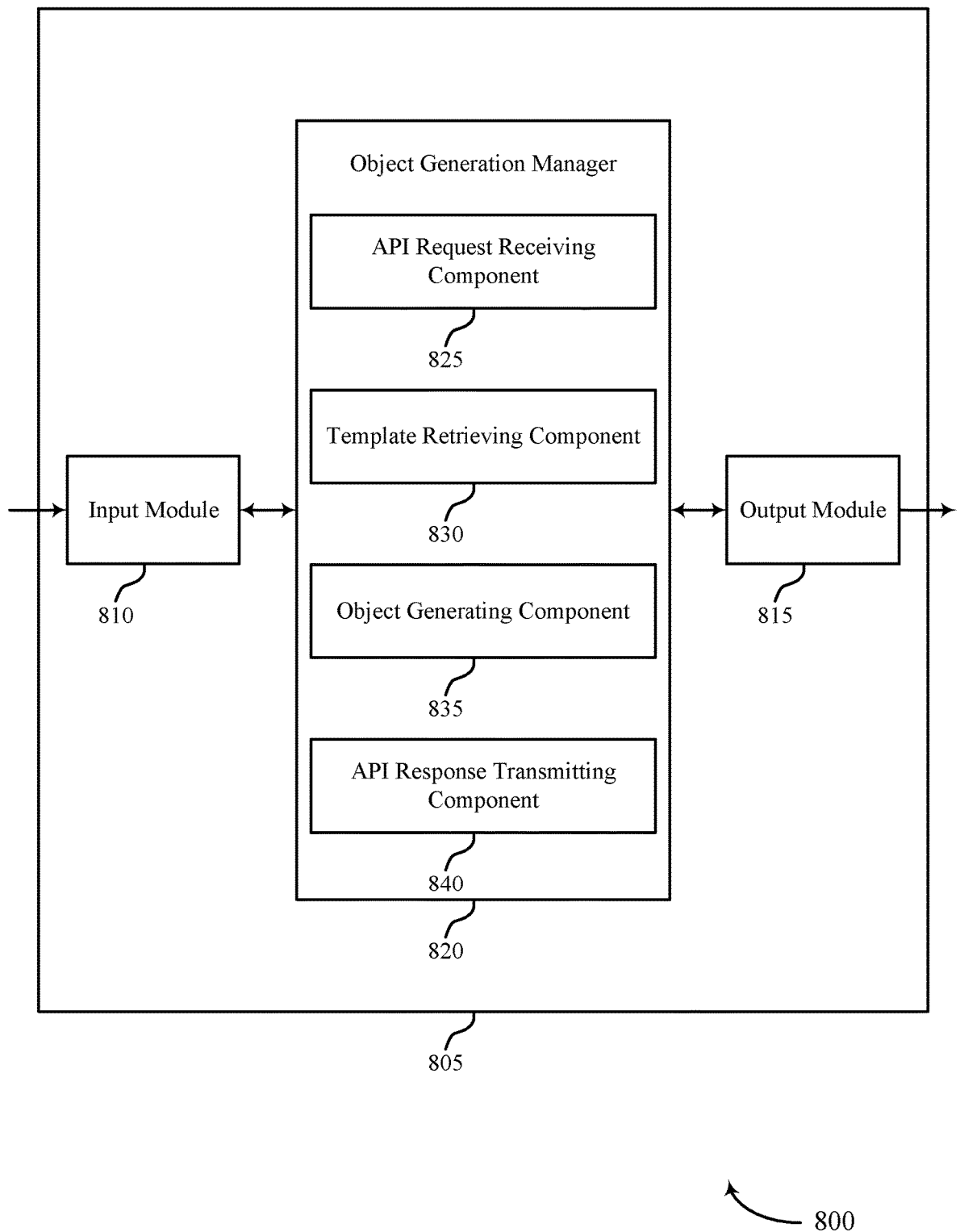
FIG. 8 shows a block diagram of an apparatus that supports techniques for data object generation in accordance with one or more aspects of the present disclosure.

FIG. 8 shows a block diagram 800 of a device 805 that supports techniques for data object generation in accordance with one or more aspects of the present disclosure. The device 805 may include an input module 810, an output module 815, and a object generation manager 820. The device 805 may also include a processor. Each of these components may be in communication with one another (e.g., via one or more buses).

The input module 810 may manage input signals for the device 805. For example, the input module 810 may identify input signals based on an interaction with a modem, a keyboard, a mouse, a touchscreen, or a similar device. These input signals may be associated with user input or processing at other components or devices. In some cases, the input module 810 may utilize an operating system such as iOS®, ANDROID®, MS-DOS®, MS-WINDOWS®, OS/2®, UNIX®, LINUX®, or another known operating system to handle input signals. The input module 810 may send aspects of these input signals to other components of the device 805 for processing. For example, the input module 810 may transmit input signals to the object generation manager 820 to support techniques for data object generation. In some cases, the input module 810 may be a component of an input/output (I/O) controller 1010, as described with reference to FIG. 10.

The output module 815 may manage output signals for the device 805. For example, the output module 815 may receive signals from other components of the device 805, such as the object generation manager 820, and may transmit these signals to other components or devices. In some examples, the output module 815 may transmit output signals for display in a user interface, for storage in a database or data store, for further processing at a server or server cluster, or for any other processes at any number of devices or systems. In some cases, the output module 815 may be a component of an I/O controller 1010, as described with reference to FIG. 10.

For example, the object generation manager 820 may include an API request receiving component 825, a template retrieving component 830, a object generating component 835, an API response transmitting component 840, or any combination thereof. In some examples, the object generation manager 820, or various components thereof, may be configured to perform various operations (e.g., receiving, monitoring, transmitting) using or otherwise in cooperation with the input module 810, the output module 815, or both. For example, the object generation manager 820 may receive information from the input module 810, send information to the output module 815, or be integrated in combination with the input module 810, the output module 815, or both to receive information, transmit information, or perform various other operations, as described herein.

The object generation manager 820 may support data object generation in accordance with examples disclosed herein. The API request receiving component 825 may be configured as or otherwise support a means for receiving, via a user interface configured for a client of a data service, an API request that indicates a first template, a second template, a data set, and one or more user identifiers, where the data set includes information from a database that is inaccessible to the data service. The template retrieving component 830 may be configured as or otherwise support a means for retrieving the first template and the second template from a template library in response to the API request, where the first template includes one or more variables, the second template includes a mapping between the one or more variables in the first template and one or more fields in the data set, and the template library includes multiple templates stored in association with different clients of the data service. The object generating component 835 may be configured as or otherwise support a means for generating a data object based on importing the one or more fields from the data set to the second template and linking the second template to the first template in accordance with the mapping between the one or more variables and the one or more fields. The API response transmitting component 840 may be configured as or otherwise support a means for transmitting, via the user interface configured for the client of the data service, an API response that includes an identifier of the data object, where the data object is accessible to the one or more user identifiers indicated by the API request.

Figure 9:
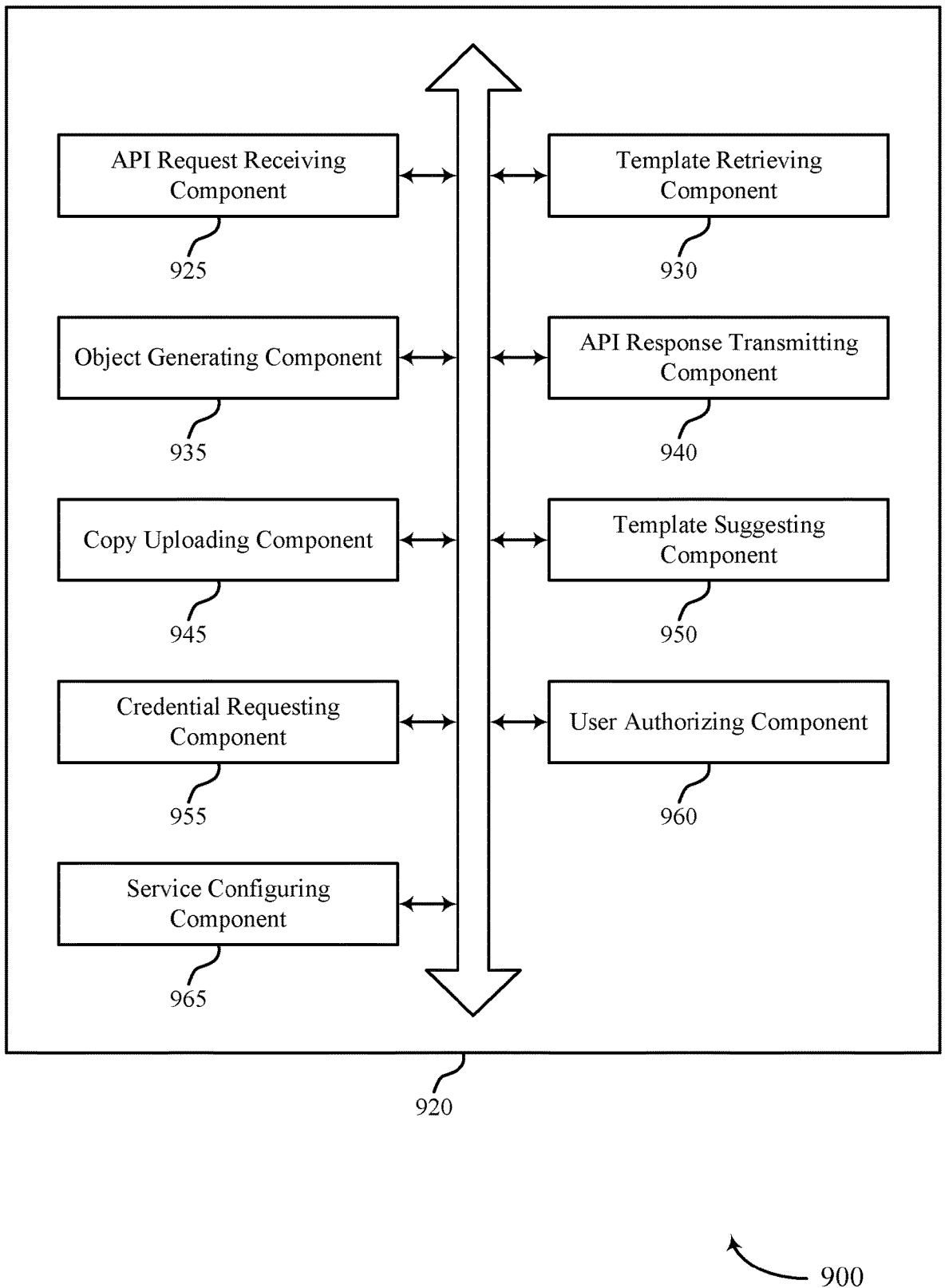
FIG. 9 shows a block diagram of a object generation manager that supports techniques for data object generation in accordance with one or more aspects of the present disclosure.

FIG. 9 shows a block diagram 900 of a object generation manager 920 that supports techniques for data object generation in accordance with one or more aspects of the present disclosure. The object generation manager 920 may be an example of aspects of a object generation manager or a object generation manager 820, or both, as described herein.

The object generation manager 920, or various components thereof, may be an example of means for performing various aspects of techniques for data object generation, as described herein. For example, the object generation manager 920 may include an API request receiving component 925, a template retrieving component 930, a object generating component 935, an API response transmitting component 940, a copy uploading component 945, a template suggesting component 950, a credential requesting component 955, a user authorizing component 960, a service configuring component 965, or any combination thereof. Each of these components may communicate, directly or indirectly, with one another (e.g., via one or more buses).

The object generation manager 920 may support data object generation in accordance with examples disclosed herein. The API request receiving component 925 may be configured as or otherwise support a means for receiving, via a user interface configured for a client of a data service, an API request that indicates a first template, a second template, a data set, and one or more user identifiers, where the data set includes information from a database that is inaccessible to the data service. The template retrieving component 930 may be configured as or otherwise support a means for retrieving the first template and the second template from a template library in response to the API request, where the first template includes one or more variables, the second template includes a mapping between the one or more variables in the first template and one or more fields in the data set, and the template library includes multiple templates stored in association with different clients of the data service. The object generating component 935 may be configured as or otherwise support a means for generating a data object based on importing the one or more fields from the data set to the second template and linking the second template to the first template in accordance with the mapping between the one or more variables and the one or more fields. The API response transmitting component 940 may be configured as or otherwise support a means for transmitting, via the user interface configured for the client of the data service, an API response that includes an identifier of the data object, where the data object is accessible to the one or more user identifiers indicated by the API request.

In some examples, to support generating the data object, the object generating component 935 may be configured as or otherwise support a means for generating one or more of a presentation, a document, a group-based communication message, an email, or an image that includes the one or more fields from the data set.

In some examples, to support receiving the API request, the API request receiving component 925 may be configured as or otherwise support a means for receiving an indication of a JSON payload that includes an identifier of the first template, an identifier of the second template, a CSV file that includes the data set, and email addresses associated with one or more users . In some examples, the CSV file is encoded using a binary-to-text encoding scheme.

In some examples, the copy uploading component 945 may be configured as or otherwise support a means for uploading copies of the first template and the second template to a shared dataspace that is accessible to the one or more user identifiers, where the identifier of the data object includes a link to the first template within the shared dataspace.

In some examples, to support generating the data object, the object generating component 935 may be configured as or otherwise support a means for generating one or more charts, graphs, images, or visualizations of the data set within the second template. In some examples, to support generating the data object, the object generating component 935 may be configured as or otherwise support a means for linking the one or more charts, graphs, images, or visualizations to the one or more variables in the first template.

In some examples, to support generating the data object, the object generating component 935 may be configured as or otherwise support a means for generating at least a portion of the data object based on using an API to replace the one or more variables in the first template with the one or more fields in the second template.

In some examples, to support transmitting the API response, the API response transmitting component 940 may be configured as or otherwise support a means for transmitting, to a user device associated with the client of the data service and via a cloud-based web service connected to the data service, an indication of a JSON payload that includes the identifier of the data object and the one or more user identifiers.

In some examples, the template suggesting component 950 may be configured as or otherwise support a means for generating a suggested template based on one or more characteristics of the data set, one or more templates associated with the client of the data service, a user-selected data object type, or a combination thereof In some examples, the template suggesting component 950 may be configured as or otherwise support a means for transmitting an indication of the suggested template for display at the user interface configured for the client of the data service. In some examples, the template suggesting component 950 may be configured as or otherwise support a means for receiving a user input that indicates a request to use the suggested template for generation of the data object.

In some examples, to support retrieving the first template and the second template, the template retrieving component 930 may be configured as or otherwise support a means for querying a shared dataspace for the first template and the second template using an identifier of the first template and an identifier of the second template, where the shared dataspace includes multiple templates configured by users associated with the client of the data service.

In some examples, the credential requesting component 955 may be configured as or otherwise support a means for transmitting, for display at the user interface configured for the client of the data service, a request for credential information associated with a user of the data service. In some examples, the user authorizing component 960 may be configured as or otherwise support a means for authorizing the user to access the data service after verifying the credential information provided by the user.

In some examples, the data service is locally hosted in a computing environment associated with the client of the data service. In some examples, one or more of the user interface, the first template, or the second template may be configured by an administrative user associated with the client of the data service.

In some examples, one or both of the first template or the second template are selected from a drop-down menu displayed in the user interface. In some examples, the client of the data service includes a group-based communication platform or a multi-tenant database system.

In some examples, the data service is configured as a microservice accessible to users via one or more software applications. In some examples, the data service supports data object generation without using third-party software or applications.

Figure 10:
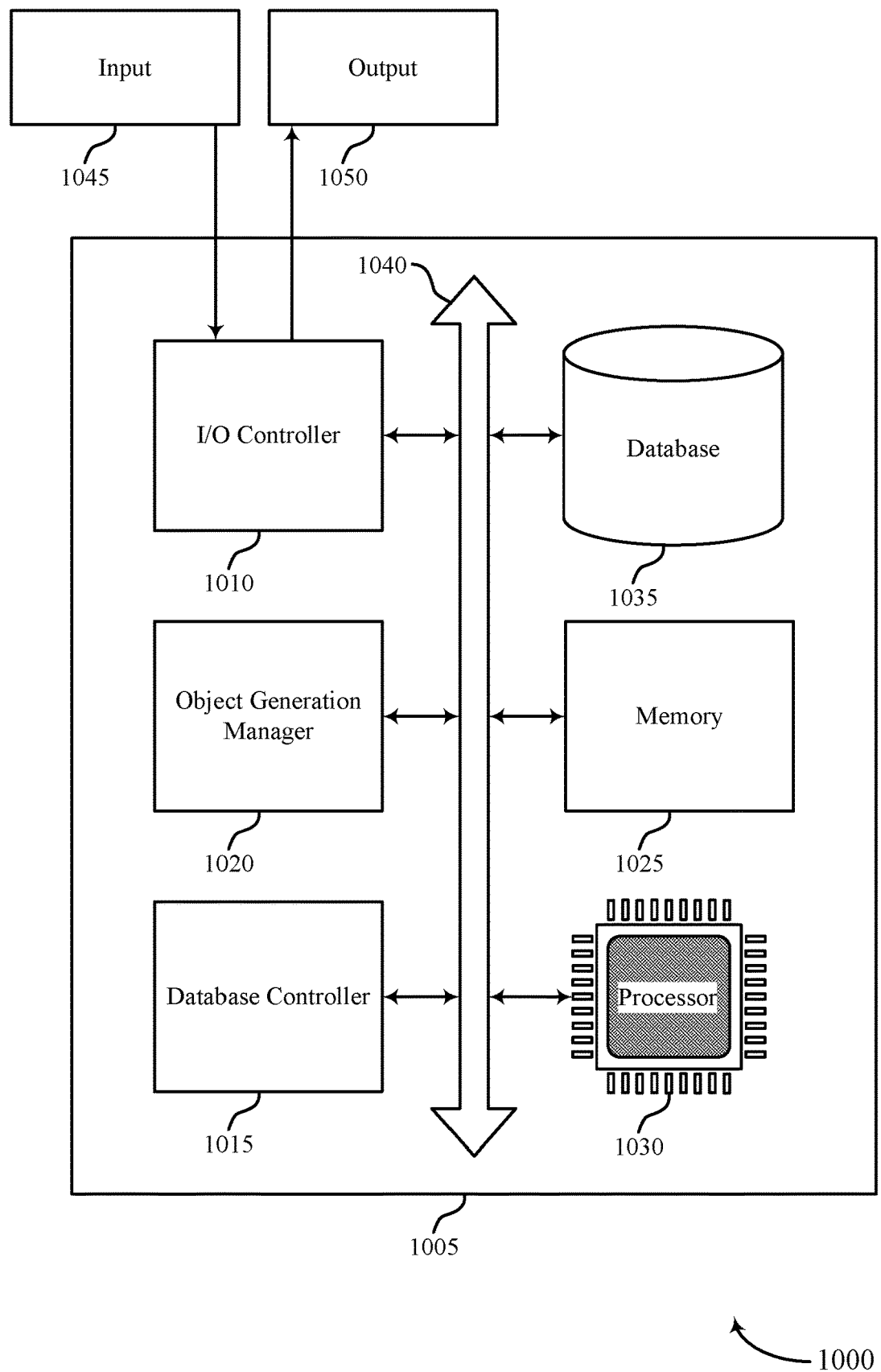
FIG. 10 shows a diagram of a system including a device that supports techniques for data object generation in accordance with one or more aspects of the present disclosure.

FIG. 10 shows a diagram of a system 1000 including a device 1005 that supports techniques for data object generation in accordance with one or more aspects of the present disclosure. The device 1005 may be an example of or include the components of a device 805, as described herein. The device 1005 may include components for data communications including components for transmitting and receiving communications, such as a object generation manager 1020, an I/O controller 1010, a database controller 1015, a memory 1025, a processor 1030, and a database 1035. These components may be in electronic communication or otherwise coupled (e.g., operatively, communicatively, functionally, electronically, electrically) via one or more buses (e.g., a bus 1040).

The I/O controller 1010 may manage input signals 1045 and output signals 1050 for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. In other cases, the I/O controller 1010 may represent or interact with a modem, a keyboard, a mouse, a touchscreen, or a similar device. In some cases, the I/O controller 1010 may be implemented as part of a processor 1030. In some examples, a user may interact with the device 1005 via the I/O controller 1010 or via hardware components controlled by the I/O controller 1010.

The database controller 1015 may manage data storage and processing in a database 1035. In some cases, a user may interact with the database controller 1015. In other cases, the database controller 1015 may operate automatically without user interaction. The database 1035 may be an example of a single database, a distributed database, multiple distributed databases, a data store, a data lake, or an emergency backup database.

Memory 1025 may include random-access memory (RAM) and read-only memory (ROM). The memory 1025 may store computer-readable, computer-executable software including instructions that, when executed, cause the processor 1030 to perform various functions described herein. In some cases, the memory 1025 may contain, among other things, a basic I/O system (BIOS), which may control basic hardware or software operation such as the interaction with peripheral components or devices.

The processor 1030 may include an intelligent hardware device, (e.g., a general-purpose processor, a digital signal processor (DSP), a central processing unit (CPU), a graphics processing unit (GPU), a microcontroller, an application-specific integrated circuit (ASIC), a field-programmable gate array (FPGA), a programmable logic device, a discrete gate or transistor logic component, a discrete hardware component, or any combination thereof). In some cases, the processor 1030 may be configured to operate a memory array using a memory controller. In other cases, a memory controller may be integrated into the processor 1030. The processor 1030 may be configured to execute computer-readable instructions stored in a memory 1025 to perform various functions (e.g., functions or tasks supporting techniques for data object generation).

The object generation manager 1020 may support data object generation in accordance with examples disclosed herein. For example, the object generation manager 1020 may be configured as or otherwise support a means for receiving, via a user interface configured for a client of a data service, an API request that indicates a first template, a second template, a data set, and one or more user identifiers, where the data set includes information from a database that is inaccessible to the data service. The object generation manager 1020 may be configured as or otherwise support a means for retrieving the first template and the second template from a template library in response to the API request, where the first template includes one or more variables, the second template includes a mapping between the one or more variables in the first template and one or more fields in the data set, and the template library includes multiple templates stored in association with different clients of the data service. The object generation manager 1020 may be configured as or otherwise support a means for generating a data object based on importing the one or more fields from the data set to the second template and linking the second template to the first template in accordance with the mapping between the one or more variables and the one or more fields. The object generation manager 1020 may be configured as or otherwise support a means for transmitting, via the user interface configured for the client of the data service, an API response that includes an identifier of the data object, where the data object is accessible to the one or more user identifiers indicated by the API request.

By including or configuring the object generation manager 1020 in accordance with examples, as described herein, the device 1005 may support techniques for generating dynamic content (e.g., slides, charts, graphs, documents) with greater efficiency, reduced manual interaction, and higher user satisfaction, among other benefits. For example, the device 1005 may be configured to communicate with a data service that supports automatic content generation in accordance with the techniques described herein, which may enable users of the device 1005 to create customized deliverables using imported CSV data.

Figure 11:
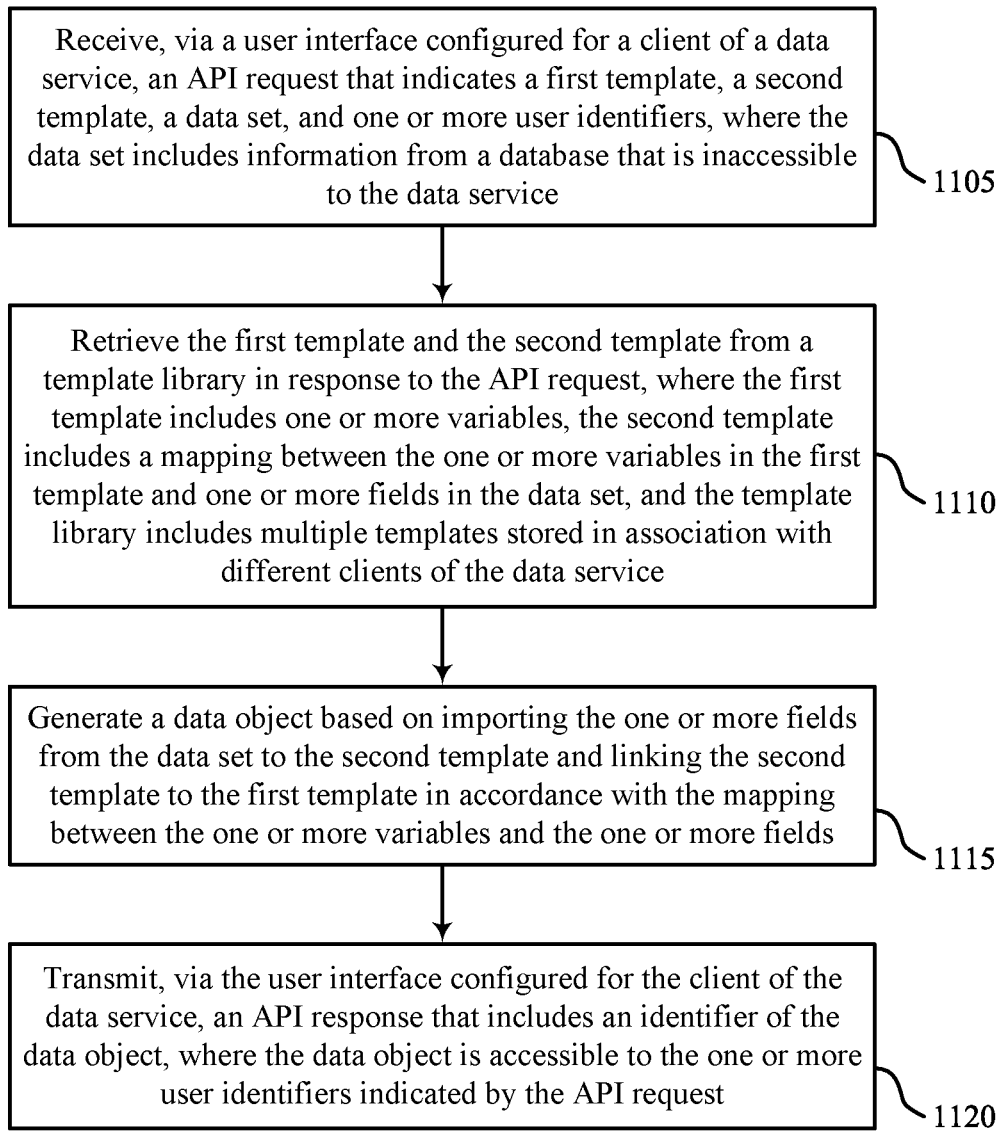
FIGS. 11 through 13 show flowcharts illustrating methods that support techniques for data object generation in accordance with one or more aspects of the present disclosure.

FIG. 11 shows a flowchart illustrating a method 1100 that supports techniques for data object generation in accordance with one or more aspects of the present disclosure. The operations of the method 1100 may be implemented by a data service or components thereof, as described herein. For example, the operations of the method 1100 may be performed by the data service 310, as described with reference to FIG. 3. In some examples, the data service may execute a set of instructions to control the functional elements of the data service to perform the described functions. Additionally, or alternatively, the data service may perform aspects of the described functions using special-purpose hardware.

At 1105, the data service may receive, via a user interface configured for a client of a data service, an API request that indicates a first template, a second template, a data set, and one or more user identifiers, where the data set includes information from a database that is inaccessible to the data service. The operations of 1105 may be performed in accordance with examples disclosed herein. In some examples, aspects of the operations of 1105 may be performed by an API request receiving component 925, as described with reference to FIG. 9.

At 1110, the data service may retrieve the first template and the second template from a template library in response to the API request, where the first template includes one or more variables, the second template includes a mapping between the one or more variables in the first template and one or more fields in the data set, and the template library includes multiple templates stored in association with different clients of the data service. The operations of 1110 may be performed in accordance with examples disclosed herein. In some examples, aspects of the operations of 1110 may be performed by a template retrieving component 930, as described with reference to FIG. 9.

At 1115, the method may include generating a data object based on importing the one or more fields from the data set to the second template and linking the second template to the first template in accordance with the mapping between the one or more variables and the one or more fields. The operations of 1115 may be performed in accordance with examples disclosed herein. In some examples, aspects of the operations of 1115 may be performed by a object generating component 935, as described with reference to FIG. 9.

At 1120, the method may include transmitting, via the user interface configured for the client of the data service, an API response that includes an identifier of the data object, where the data object is accessible to the one or more user identifiers indicated by the API request. The operations of 1120 may be performed in accordance with examples disclosed herein. In some examples, aspects of the operations of 1120 may be performed by an API response transmitting component 940, as described with reference to FIG. 9.

Figure 12:
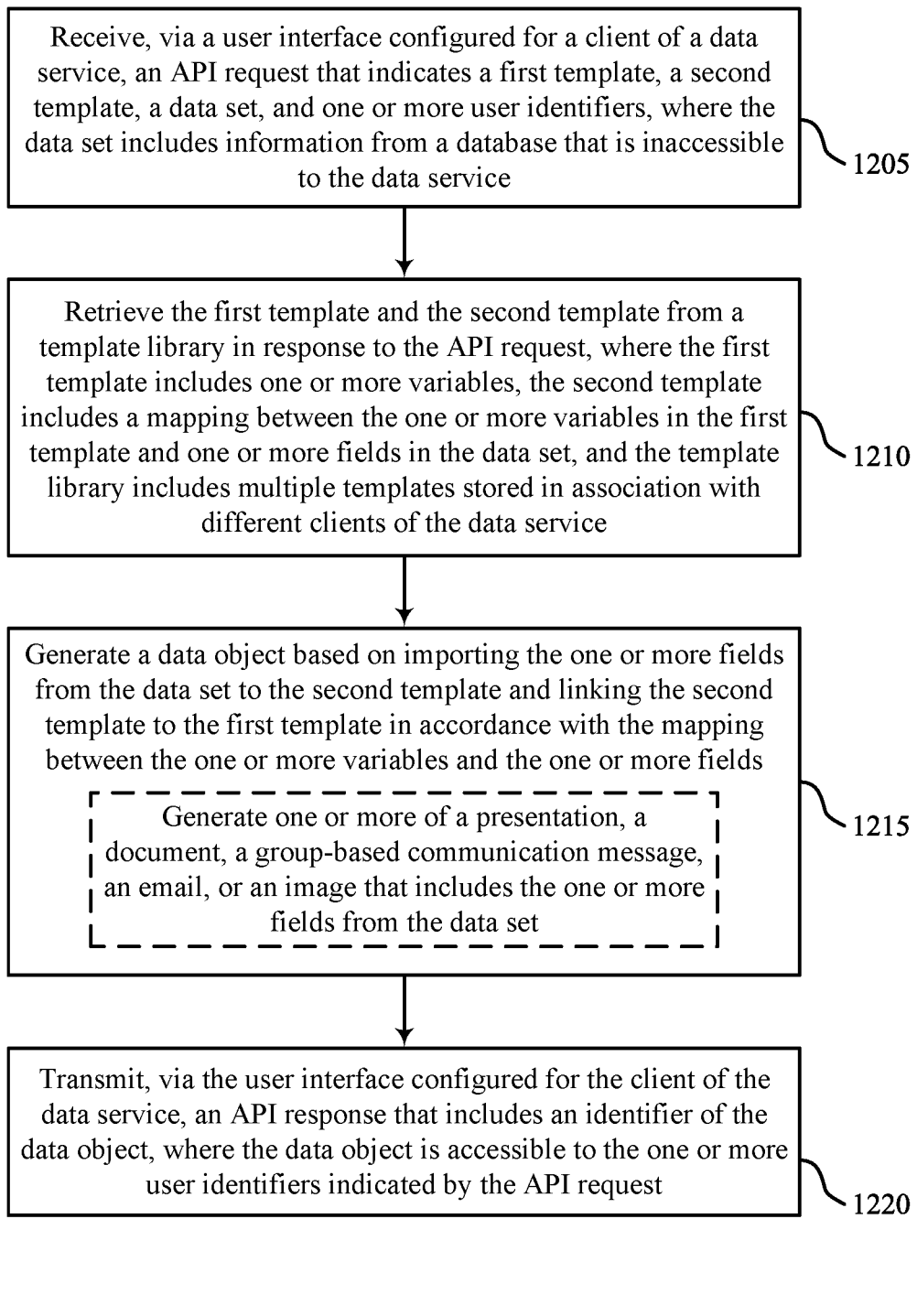

FIG. 12 shows a flowchart illustrating a method 1200 that supports techniques for data object generation in accordance with one or more aspects of the present disclosure. The operations of the method 1200 may be implemented by a data service or components thereof, as described herein. For example, the operations of the method 1200 may be performed by the data service 420, as described with reference to FIG. 4. In some examples, the data service may execute a set of instructions to control the functional elements of the data service to perform the described functions. Additionally, or alternatively, the data service may perform aspects of the described functions using special-purpose hardware.

At 1205, the data service may receive, via a user interface configured for a client of a data service, an API request that indicates a first template, a second template, a data set, and one or more user identifiers, where the data set includes information from a database that is inaccessible to the data service. The operations of 1205 may be performed in accordance with examples disclosed herein. In some examples, aspects of the operations of 1205 may be performed by an API request receiving component 925, as described with reference to FIG. 9.

At 1210, the data service may retrieve the first template and the second template from a template library in response to the API request, where the first template includes one or more variables, the second template includes a mapping between the one or more variables in the first template and one or more fields in the data set, and the template library includes multiple templates stored in association with different clients of the data service. The operations of 1210 may be performed in accordance with examples disclosed herein. In some examples, aspects of the operations of 1210 may be performed by a template retrieving component 930, as described with reference to FIG. 9.

At 1215, the method may include generating a data object based on importing the one or more fields from the data set to the second template and linking the second template to the first template in accordance with the mapping between the one or more variables and the one or more fields. In some examples, the data object may include one or more of a presentation, a document, a group-based communication message, an email, or an image that includes the one or more fields from the data set. The operations of 1215 may be performed in accordance with examples disclosed herein. In some examples, aspects of the operations of 1215 may be performed by a object generating component 935, as described with reference to FIG. 9.

At 1220, the method may include transmitting, via the user interface configured for the client of the data service, an API response that includes an identifier of the data object, where the data object is accessible to the one or more user identifiers indicated by the API request. The operations of 1220 may be performed in accordance with examples disclosed herein. In some examples, aspects of the operations of 1220 may be performed by an API response transmitting component 940, as described with reference to FIG. 9.

Figure 13:
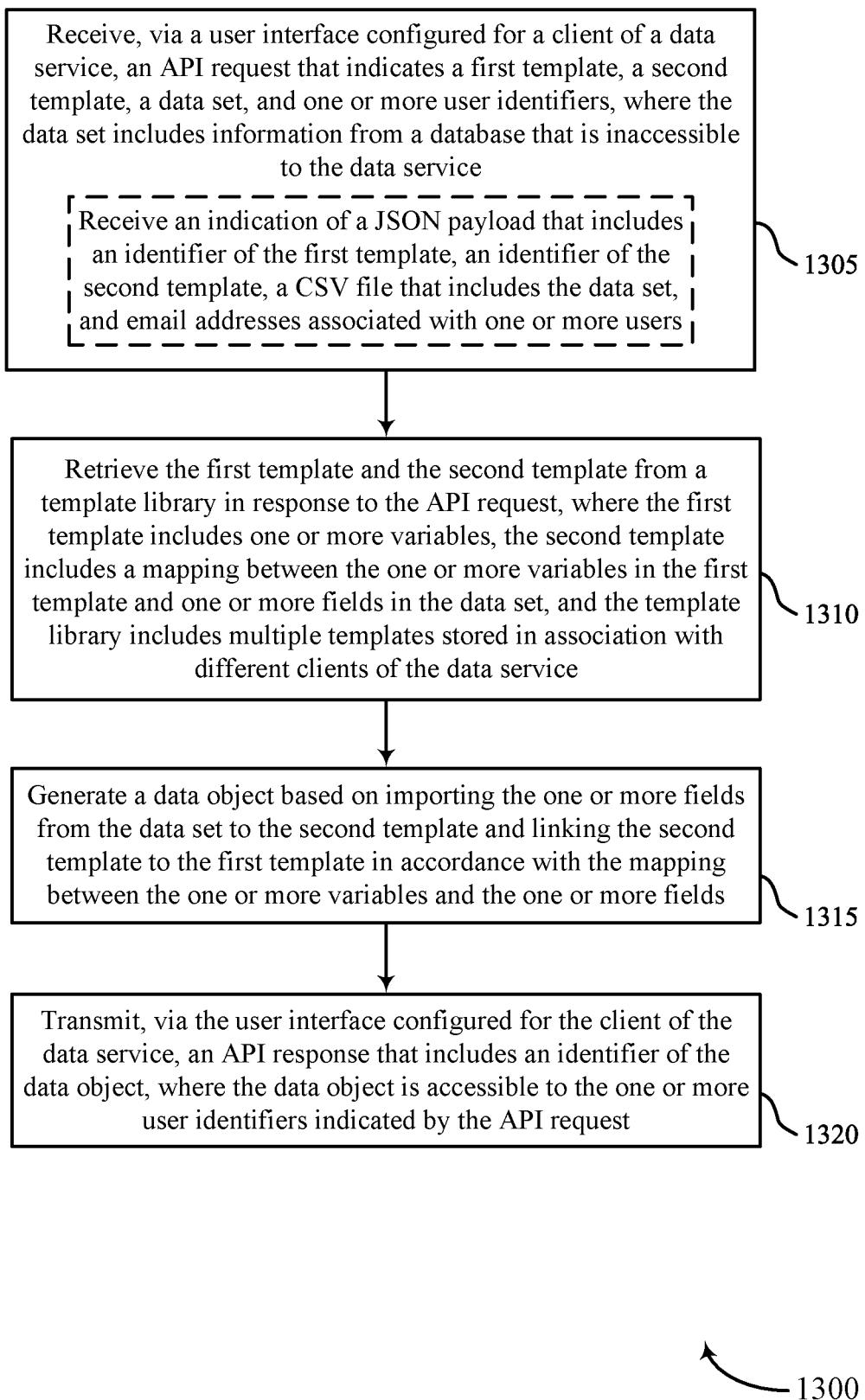

FIG. 13 shows a flowchart illustrating a method 1300 that supports techniques for data object generation in accordance with one or more aspects of the present disclosure. The operations of the method 1300 may be implemented by a data service or components thereof, as described herein. For example, the operations of the method 1300 may be performed by the data service 710, as described with reference to FIG. 7. In some examples, the data service may execute a set of instructions to control the functional elements of the data service to perform the described functions. Additionally, or alternatively, the data service may perform aspects of the described functions using special-purpose hardware.

At 1305, the data service may receive, via a user interface configured for a client of a data service, an API request that indicates a first template, a second template, a data set, and one or more user identifiers, where the data set includes information from a database that is inaccessible to the data service. In some examples, the API request may include an indication of a JSON payload that includes an identifier of the first template, an identifier of the second template, a CSV file that includes the data set, and email addresses associated with one or more users. The operations of 1305 may be performed in accordance with examples disclosed herein. In some examples, aspects of the operations of 1305 may be performed by an API request receiving component 925, as described with reference to FIG. 9.

At 1310, the data service may retrieve the first template and the second template from a template library in response to the API request, where the first template includes one or more variables, the second template includes a mapping between the one or more variables in the first template and one or more fields in the data set, and the template library includes multiple templates stored in association with different clients of the data service. The operations of 1310 may be performed in accordance with examples disclosed herein. In some examples, aspects of the operations of 1310 may be performed by a template retrieving component 930, as described with reference to FIG. 9.

At 1315, the data service may generate a data object based on importing the one or more fields from the data set to the second template and linking the second template to the first template in accordance with the mapping between the one or more variables and the one or more fields. The operations of 1315 may be performed in accordance with examples disclosed herein. In some examples, aspects of the operations of 1315 may be performed by a object generating component 935, as described with reference to FIG. 9.

At 1320, the data service may transmit, via the user interface configured for the client of the data service, an API response that includes an identifier of the data object, where the data object is accessible to the one or more user identifiers indicated by the API request. The operations of 1320 may be performed in accordance with examples disclosed herein. In some examples, aspects of the operations of 1320 may be performed by an API response transmitting component 940, as described with reference to FIG. 9.

A method for data object generation is described. The method may include receiving, via a user interface configured for a client of a data service, an API request that indicates a first template, a second template, a data set, and one or more user identifiers, where the data set includes information from a database that is inaccessible to the data service. The method may further include retrieving the first template and the second template from a template library in response to the API request, where the first template includes one or more variables, the second template includes a mapping between the one or more variables in the first template and one or more fields in the data set, and the template library includes multiple templates stored in association with different clients of the data service. The method may further include generating a data object based on importing the one or more fields from the data set to the second template and linking the second template to the first template in accordance with the mapping between the one or more variables and the one or more fields. The method may further include transmitting, via the user interface configured for the client of the data service, an API response that includes an identifier of the data object, where the data object is accessible to the one or more user identifiers indicated by the API request.

An apparatus for data object generation is described. The apparatus may include a processor, memory coupled with the processor, and instructions stored in the memory. The instructions may be executable by the processor to cause the apparatus to receive, via a user interface configured for a client of a data service, an API request that indicates a first template, a second template, a data set, and one or more user identifiers, where the data set includes information from a database that is inaccessible to the data service. The instructions may be further executable by the processor to cause the apparatus to retrieve the first template and the second template from a template library in response to the API request, where the first template include one or more variables, the second template include a mapping between the one or more variables in the first template and one or more fields in the data set, and the template library includes multiple templates stored in association with different clients of the data service. The instructions may be further executable by the processor to cause the apparatus to generate a data object based on importing the one or more fields from the data set to the second template and linking the second template to the first template in accordance with the mapping between the one or more variables and the one or more fields. The instructions may be further executable by the processor to cause the apparatus to transmit, via the user interface configured for the client of the data service, an API response that includes an identifier of the data object, where the data object is accessible to the one or more user identifiers indicated by the API request.

Another apparatus for data object generation is described. The apparatus may include means for receiving, via a user interface configured for a client of a data service, an API request that indicates a first template, a second template, a data set, and one or more user identifiers, where the data set includes information from a database that is inaccessible to the data service. The apparatus may further include means for retrieving the first template and the second template from a template library in response to the API request, where the first template includes one or more variables, the second template includes a mapping between the one or more variables in the first template and one or more fields in the data set, and the template library includes multiple templates stored in association with different clients of the data service. The apparatus may further include means for generating a data object based on importing the one or more fields from the data set to the second template and linking the second template to the first template in accordance with the mapping between the one or more variables and the one or more fields. The apparatus may further include means for transmitting, via the user interface configured for the client of the data service, an API response that includes an identifier of the data object, where the data object is accessible to the one or more user identifiers indicated by the API request.

A non-transitory computer-readable medium storing code for data object generation is described. The code may include instructions executable by a processor to receive, via a user interface configured for a client of a data service, an API request that indicates a first template, a second template, a data set, and one or more user identifiers, where the data set includes information from a database that is inaccessible to the data service. The instructions may be further executable by the processor to retrieve the first template and the second template from a template library in response to the API request, where the first template includes one or more variables, the second template includes a mapping between the one or more variables in the first template and one or more fields in the data set, and the template library includes multiple templates stored in association with different clients of the data service. The instructions may be further executable by the processor to generate a data object based on importing the one or more fields from the data set to the second template and linking the second template to the first template in accordance with the mapping between the one or more variables and the one or more fields. The instructions may be further executable by the processor to transmit, via the user interface configured for the client of the data service, an API response that includes an identifier of the data object, where the data object is accessible to the one or more user identifiers indicated by the API request.

In some examples of the methods, apparatuses, and non-transitory computer-readable media described herein, generating the data object may include operations, features, means, or instructions for generating one or more of a presentation, a document, a group-based communication message, an email, or an image that includes the one or more fields from the data set.

In some examples of the methods, apparatuses, and non-transitory computer-readable media described herein, receiving the API request may include operations, features, means, or instructions for receiving an indication of a JSON payload that includes an identifier of the first template, an identifier of the second template, a CSV file that includes the data set, and email addresses associated with one or more users.

In some examples of the methods, apparatuses, and non-transitory computer-readable media described herein, the CSV file may be encoded using a binary-to-text encoding scheme.

Some examples of the methods, apparatuses, and non-transitory computer-readable media described herein may further include operations, features, means, or instructions for uploading copies of the first template and the second template to a shared dataspace that is accessible to the one or more user identifiers, where the identifier of the data object includes a link to the first template within the shared dataspace.

In some examples of the methods, apparatuses, and non-transitory computer-readable media described herein, generating the data object may include operations, features, means, or instructions for generating one or more charts, graphs, images, or visualizations of the data set within the second template and linking the one or more charts, graphs, images, or visualizations to the one or more variables in the first template.

In some examples of the methods, apparatuses, and non-transitory computer-readable media described herein, generating the data object may include operations, features, means, or instructions for generating at least a portion of the data object based on using an API to replace the one or more variables in the first template with the one or more fields in the second template.

In some examples of the methods, apparatuses, and non-transitory computer-readable media described herein, transmitting the API response may include operations, features, means, or instructions for transmitting, to a user device associated with the client of the data service and via a cloud-based web service connected to the data service, an indication of a JSON payload that includes the identifier of the data object and the one or more user identifiers.

Some examples of the methods, apparatuses, and non-transitory computer-readable media described herein may further include operations, features, means, or instructions for generating a suggested template based on one or more characteristics of the data set, one or more templates associated with the client of the data service, a user-selected data object type, or a combination thereof.

Some examples of the methods, apparatuses, and non-transitory computer-readable media described herein may further include operations, features, means, or instructions for transmitting an indication of the suggested template for display at the user interface configured for the client of the data service and receiving a user input that indicates a request to use the suggested template for generation of the data object.

In some examples of the methods, apparatuses, and non-transitory computer-readable media described herein, retrieving the first template and the second template may include operations, features, means, or instructions for querying a shared dataspace for the first template and the second template using an identifier of the first template and an identifier of the second template, where the shared dataspace includes multiple templates configured by users associated with the client of the data service.

Some examples of the methods, apparatuses, and non-transitory computer-readable media described herein may further include operations, features, means, or instructions for transmitting, for display at the user interface configured for the client of the data service, a request for credential information associated with a user of the data service.

Some examples of the methods, apparatuses, and non-transitory computer-readable media described herein may further include operations, features, means, or instructions for authorizing the user to access the data service after verifying the credential information provided by the user.

In some examples of the methods, apparatuses, and non-transitory computer-readable media described herein, the data service may be locally hosted in a computing environment associated with the client of the data service.

In some examples of the methods, apparatuses, and non-transitory computer-readable media described herein, one or more of the user interface, the second template, or the first template may be configured by an administrative user associated with the client of the data service.

In some examples of the methods, apparatuses, and non-transitory computer-readable media described herein, one or both of the first template or the second template may be selected from a drop-down menu displayed in the user interface.

In some examples of the methods, apparatuses, and non-transitory computer-readable media described herein, the client of the data service includes a group-based communication platform or a multi-tenant database system.

In some examples of the methods, apparatuses, and non-transitory computer-readable media described herein, the data service may be configured as a microservice accessible to users via one or more software applications, and the data service may support dynamic content generation without using third-party software or applications.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (e.g., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable ROM (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for data object generation, comprising:
   receiving, via a user interface configured for a client of a data service, an application programming interface (API) request that indicates a first template, a second template, a data set, and one or more user identifiers, wherein the data set comprises information from a database that is inaccessible to the data service;
   retrieving the first template and the second template from a template library in response to the API request, wherein:
      the first template comprises one or more variables;
      the second template comprises a mapping between the one or more variables in the first template and one or more fields in the data set; and
      the template library comprises a plurality of templates stored in association with different clients of the data service;
   generating a data object based at least in part on importing the one or more fields from the data set to the second template and linking the second template to the first template in accordance with the mapping between the one or more variables and the one or more fields; and
   transmitting, via the user interface configured for the client of the data service, an API response comprising an identifier of the data object, wherein the data object is accessible to the one or more user identifiers indicated by the API request.

2. The method of claim 1, wherein generating the data object comprises:
   generating one or more of a presentation, a document, a group-based communication message, an email, or an image that includes the one or more fields from the data set.

3. The method of claim 1, wherein receiving the API request comprises:
   receiving an indication of a JavaScript Object Notation (JSON) object that comprises an identifier of the first template, an identifier of the second template, a comma-separated values (CSV) file that includes the data set, and email addresses associated with one or more users.

4. The method of claim 3, wherein the CSV file is encoded using a binary-to-text encoding scheme.

5. The method of claim 1, further comprising:
   uploading copies of the first template and the second template to a shared dataspace that is accessible to the one or more user identifiers, wherein the identifier of the data object comprises a link to the first template within the shared dataspace.

6. The method of claim 1, wherein generating the data object comprises:
   generating one or more charts, graphs, images, or visualizations of the data set within the second template; and
   linking the one or more charts, graphs, images, or visualizations to the one or more variables in the first template.

7. The method of claim 1, wherein generating the data object comprises:
   generating at least a portion of the data object based at least in part on using an API to replace the one or more variables in the first template with the one or more fields in the second template.

8. The method of claim 1, wherein transmitting the API response comprises:
   transmitting, to a user device associated with the client of the data service and via a cloud-based web service connected to the data service, an indication of a JavaScript Object Notation (JSON) object that includes the identifier of the data object and the one or more user identifiers .

9. The method of claim 1, further comprising:
   generating a suggested template based at least in part on one or more characteristics of the data set, one or more templates associated with the client of the data service, a user-selected data object type, or a combination thereof.

10. The method of claim 9, further comprising:
transmitting an indication of the suggested template for display at the user interface configured for the client of the data service; and
receiving a user input that indicates a request to use the suggested template for generation of the data object.

11. The method of claim 1, wherein retrieving the first template and the second template comprises:
querying a shared dataspace for the first template and the second template using an identifier of the first template and an identifier of the second template, wherein the shared dataspace comprises a plurality of templates configured by users associated with the client of the data service.

12. The method of claim 1, further comprising:
transmitting, for display at the user interface configured for the client of the data service, a request for credential information associated with a user of the data service; and
authorizing the user to access the data service after verifying the credential information provided by the user.

13. The method of claim 1, wherein the data service is locally hosted in a computing environment associated with the client of the data service.

14. The method of claim 1, wherein one or more of the user interface, the first template, or the second template are configured by an administrative user associated with the client of the data service.

15. The method of claim 1, wherein one or both of the first template or the second template are selected from a drop-down menu displayed in the user interface.

16. The method of claim 1, wherein the client of the data service comprises a group-based communication platform or a multi-tenant database system.

17. The method of claim 1, wherein:
the data service is configured as a microservice accessible to users via one or more software applications; and
the data service supports data object generation without using third-party software or applications.

18. An apparatus for data object generation, comprising:
a processor;
memory coupled with the processor; and
instructions stored in the memory and executable by the processor to cause the apparatus to:
receive, via a user interface configured for a client of a data service, an application programming interface (API) request that indicates a first template, a second template, a data set, and one or more user identifiers, wherein the data set comprises information from a database that is inaccessible to the data service;
retrieve the first template and the second template from a template library in response to the API request, wherein:
the first template comprises one or more variables;
the second template comprises a mapping between the one or more variables in the first template and one or more fields in the data set; and
the template library comprises a plurality of templates stored in association with different clients of the data service;
generate a data object based at least in part on importing the one or more fields from the data set to the second template and linking the second template to the first template in accordance with the mapping between the one or more variables and the one or more fields; and
transmit, via the user interface configured for the client of the data service, an API response that comprises an identifier of the data object, wherein the data object is accessible to the one or more user identifiers indicated by the API request.

19. The apparatus of claim 18, wherein, to receive the API request, the instructions are executable by the processor to cause the apparatus to:
receive an indication of a JavaScript Object Notation (JSON) object that comprises an identifier of the first template, an identifier of the second template, a comma-separated values (CSV) file that includes the data set, and email addresses associated with one or more users.

20. A non-transitory computer-readable medium storing code for data object generation, the code comprising instructions executable by a processor to:
receive, via a user interface configured for a client of a data service, an application programming interface (API) request that indicates a first template, a second template, a data set, and one or more user identifiers, wherein the data set comprises information from a database that is inaccessible to the data service;
retrieve the first template and the second template from a template library in response to the API request, wherein:
the first template comprises one or more variables;
the second template comprises a mapping between the one or more variables in the first template and one or more fields in the data set; and
the template library comprises a plurality of templates stored in association with different clients of the data service;
generate a data object based at least in part on importing the one or more fields from the data set to the second template and linking the second template to the first template in accordance with the mapping between the one or more variables and the one or more fields; and
transmit, via the user interface configured for the client of the data service, an API response that comprises an identifier of the data object, wherein the data object is accessible to the one or more user identifiers indicated by the API request.

* * * * *